United States Patent
Swei

(10) Patent No.: US 9,004,754 B2
(45) Date of Patent: Apr. 14, 2015

(54) THERMAL SENSORS AND METHODS OF OPERATING THEREOF

(75) Inventor: Steven Swei, Fremont, CA (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 617 days.

(21) Appl. No.: 13/173,112

(22) Filed: Jun. 30, 2011

(65) Prior Publication Data

US 2011/0255568 A1    Oct. 20, 2011

Related U.S. Application Data

(63) Continuation-in-part of application No. 12/764,532, filed on Apr. 21, 2010, now Pat. No. 8,475,039.

(60) Provisional application No. 61/171,684, filed on Apr. 22, 2009.

(51) Int. Cl.
*G01K 7/01*   (2006.01)
*G01K 7/14*   (2006.01)
*G01K 7/16*   (2006.01)

(52) U.S. Cl.
CPC .............. *G01K 7/01* (2013.01); *G01K 2219/00* (2013.01)

(58) Field of Classification Search
USPC .............................................. 702/130, 99, 136
See application file for complete search history.

(56) References Cited

U.S. PATENT DOCUMENTS

| | | | | |
|---|---|---|---|---|
| 5,841,314 A * | 11/1998 | Brigati et al. | ................... | 327/536 |
| 5,873,053 A * | 2/1999 | Pricer et al. | ................... | 702/130 |
| 6,183,131 B1 | 2/2001 | Holloway et al. | | |
| 6,255,892 B1 * | 7/2001 | Gartner et al. | ................. | 327/512 |
| 6,437,614 B1 * | 8/2002 | Chen | ............................. | 327/143 |
| 6,789,939 B2 * | 9/2004 | Schrodinger et al. | ......... | 374/178 |
| 6,876,250 B2 * | 4/2005 | Hsu et al. | ...................... | 327/539 |
| 7,107,178 B2 * | 9/2006 | Won et al. | .................... | 702/130 |
| 7,173,407 B2 * | 2/2007 | Marinca | ....................... | 323/316 |

(Continued)

FOREIGN PATENT DOCUMENTS

CN    101871820    10/2010

OTHER PUBLICATIONS

Duarte, David E., et al., "Temperature Sensor Design in a High Volume Manufacturing 65nm CMOS Digital Process", IEEE 2007 Custom Integrated Circuits Conference (CICC), pp. 221-224.

(Continued)

*Primary Examiner* — Gail Kaplan Verbitsky
(74) *Attorney, Agent, or Firm* — Lowe Hauptman & Ham, LLP

(57) ABSTRACT

A thermal sensor includes a comparator having a first and second input nodes. A reference voltage generator is electrically coupled with the first input node. The reference voltage generator is configured to provide a reference voltage that is substantially temperature-independent. A temperature sensing circuit is electrically coupled with the second input node. The temperature sensing circuit is configured to provide a temperature-dependent voltage. The temperature sensing circuit includes a current mirror. A first metal-oxide-semiconductor (MOS) transistor is electrically coupled between the current mirror and ground. A first resistor is electrically coupled with the current mirror. A second MOS transistor is electrically coupled with the first resistor in series. The second MOS transistor and the first resistor are electrically coupled with the first MOS transistor in a parallel fashion.

20 Claims, 16 Drawing Sheets

(56) References Cited

U.S. PATENT DOCUMENTS

| | | |
|---|---|---|
| 7,792,167 B2 | 9/2010 | Kanesaka |
| 7,852,144 B1 * | 12/2010 | Zonte et al. .................... 327/543 |
| 7,965,129 B1 * | 6/2011 | Wadhwa et al. ............. 327/513 |
| 8,063,623 B2 * | 11/2011 | Negoi et al. .................... 323/312 |
| 8,206,031 B2 | 6/2012 | Aznai |
| 8,262,286 B2 * | 9/2012 | Peterson et al. ............. 374/170 |
| 8,308,359 B2 * | 11/2012 | Walker .......................... 374/176 |
| 8,475,039 B2 * | 7/2013 | Chern et al. .................. 374/170 |
| 8,723,594 B2 * | 5/2014 | Sakaguchi .................... 327/538 |
| 2006/0056485 A1 * | 3/2006 | Hartley ......................... 374/170 |
| 2006/0111865 A1 * | 5/2006 | Choi ............................. 702/130 |
| 2007/0146047 A1 * | 6/2007 | Senriuchi et al. ............. 327/512 |
| 2007/0216468 A1 | 9/2007 | Duarte |
| 2008/0069196 A1 * | 3/2008 | Choi ............................. 375/231 |
| 2009/0046761 A1 * | 2/2009 | Pan ............................... 374/178 |
| 2009/0201067 A1 * | 8/2009 | Haneda ......................... 327/306 |
| 2009/0284242 A1 * | 11/2009 | Motz ............................. 323/313 |
| 2010/0002747 A1 | 1/2010 | Bosch et al. |
| 2010/0073070 A1 * | 3/2010 | Ng et al. ....................... 327/513 |
| 2010/0201430 A1 * | 8/2010 | Fort .............................. 327/513 |
| 2010/0271246 A1 | 10/2010 | Chern et al. |
| 2010/0301832 A1 * | 12/2010 | Katyal et al. ................. 323/314 |
| 2011/0068854 A1 * | 3/2011 | Engl ............................. 327/512 |
| 2011/0158286 A1 * | 6/2011 | Peterson ....................... 374/170 |
| 2011/0169553 A1 * | 7/2011 | Wadhwa et al. ............. 327/513 |
| 2011/0221508 A1 * | 9/2011 | Kang et al. ................... 327/513 |
| 2011/0255568 A1 | 10/2011 | Swei |
| 2011/0285469 A1 | 11/2011 | Mosalikanti et al. |

OTHER PUBLICATIONS

Swei, Steven et al., "High-Precision Temperature Sensor Apparatus and Method (Embodiment with a PTAT Temperature Measuring Circuitry)", TSMC, Ltd. 2007.

* cited by examiner

1100

| L | $M_{40}$ | $M_{41}$ | $M_{42}$ | $M_{43}$ |
|---|---|---|---|---|
| 0 | ON | OFF | OFF | OFF |
| 1 | ON | ON | OFF | OFF |
| 2 | ON | ON | ON | OFF |
| 3 | ON | ON | ON | ON |

Fig. 11

| L | CT₀ | CT₁ | CT₂ | CT₃ |
|---|-----|-----|-----|-----|
| 0 | 0 | 1 | 1 | 1 |
| 1 | 0 | 0 | 1 | 1 |
| 2 | 0 | 0 | 0 | 1 |
| 3 | 0 | 0 | 0 | 0 |

THERMAL SENSORS AND METHODS OF OPERATING THEREOF

CROSS-REFERENCES TO RELATED APPLICATIONS

The present application is a continuation-in-part of U.S. patent application Ser. No. 12/764,532, filed Apr. 21, 2010 and entitled "PROVIDING LINEAR RELATIONSHIP BETWEEN TEMPERATURE AND DIGITAL CODE," which in turn claims benefit to U.S. Provisional Application Ser. No. 61/171,684 and filed Apr. 22, 2009," which are hereby incorporated by reference in their entirety.

TECHNICAL FIELD

Embodiments of the application are related to generating linear relationship between temperatures and digital codes. Various embodiments are used in temperature sensors.

BACKGROUND

A temperature sensor can be used to monitor temperature of an electronic component such as a CPU (Central Processing Unit), CPU (Graphics Processing Unit), MPU (Micro Processing Unit), SOC (System On Chip), etc. When the temperature exceeds predetermined thresholds, the sensor may alert a circuitry to slow down or even shut down the unit to reduce power consumption and thus reduce the temperature so that overheat that can cause destructive failure to the unit may be prevented.

Typically, temperature sensors include a reference circuitry and a temperature measuring circuitry wherein the temperature dependency is either proportional to absolute temperature (PTAT) or complementary to absolute temperature (CTAT). Further, DAC (digital to analog converter) based temperature sensors relying on comparing a PTAT voltage and a CTAT base-emitter voltage may be used. This approach, however, suffers from DAC code-to-temperature non-linearity issues, i.e., it cannot achieve good linearity over a wide temperature range, resulting in poor temperature measurement accuracy.

In some approaches involving a CTAT voltage, the compared voltage varies with high temperature coefficient over the design temperature range. When the compared voltage is PTAT, the implementation scheme introduces an intrinsic DAC code-to-temperature nonlinearity, and, as a result, suffers from poor temperature measurement accuracy unless an extensive temperature calibration (e.g., many-point calibration) is performed. Other approaches trying to cause the compared (or reference) voltage family curves to be parallel, and thus better DAC code-to-temperature linearity, are far from successful because the curves, in reality, are not parallel. These approaches therefore also suffer from poor temperature measurement accuracy.

SUMMARY

Embodiments of the application relate to providing linear relationship between temperatures and digital codes. Various embodiments are used in temperature sensors. In an embodiment, at a particular temperature (e.g., operational temperature of a semiconductor device), a circuit (e.g., temperature sensing circuit) in the sensor provides a temperature dependent reference voltage, e.g., $V_{CTAT}$ and a compared voltage, e.g., $V_{CMP}$, to a comparator. $V_{CTAT}$ depends on temperature as complement to absolute temperature. The compared voltage $V_{CMP}$ is generated having DAC codes as inputs. If $V_{CTAT}$ and $V_{CMP}$ are equal, then the comparator output so indicates, e.g., by providing a true logic. If $V_{CTAT}$ and $V_{CMP}$ are not equal, then the comparator output is provided to another circuit (e.g., an adjusting circuit) that varies the DAC codes until $V_{CTAT}$ and $V_{CMP}$ are equal. In effect, at a particular point in time, the temperature experienced by the temperature sensing circuit corresponds to a DAC code when $V_{CTAT}$ and $V_{CMP}$ are equal. In various embodiments, the various temperatures experienced by the temperature sensing circuit and the DAC codes are substantially linearly related. Other embodiments and embodiments related to a voltage that depends on temperature as proportional to absolute temperature (e.g., $V_{PTAT}$) are also disclosed.

Embodiments of the application can have one or a combination of the following features and/or advantages. Embodiments of the temperature sensing circuit can be integrated in semiconductor circuitry manufactured by advanced CMOS (Complementary Metal Oxide Semiconductor) processes. The linear relationship between the temperatures and the DAC codes increases accuracy of the temperature sensing circuitry and allows simple temperature calibration that, in turn, enables accurate temperature sensing.

BRIEF DESCRIPTION OF THE DRAWINGS

The details of one or more embodiments of the application are set forth in the accompanying drawings and the description below. Other features and advantages of the application will be apparent from the description, drawings, and claims.

FIG. 11 shows a table 1100 illustrating correspondence between values that can be used as digital codes and the number of transistors $M_4$ in circuit 1000 being turned on or off.

FIG. 12 shows a table 1200 illustrating the relationship between values that can be used as digital codes and signals CT in FIG. 10.

Like reference symbols in the various drawings indicate like elements.

DETAILED DESCRIPTION

Figure 1:
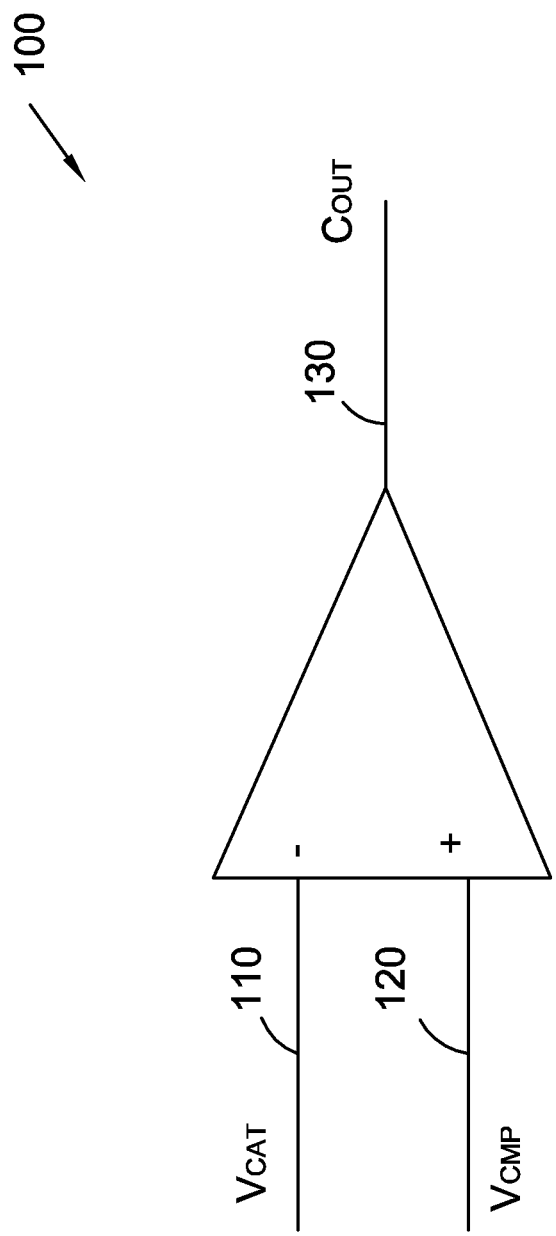
FIG. 1 shows a circuit 100 related to a CTAT-type implementation in accordance with an embodiment of the application.

Embodiments, or examples, of the application illustrated in the drawings are now being described using specific languages. It will nevertheless be understood that no limitation of the scope of the application is thereby intended. Any alterations and modifications in the described embodiments, and any further applications of principles of the application described in this document are contemplated as would normally occur to one skilled in the art to which the application relates. Reference numbers may be repeated throughout the embodiments, but this does not necessarily require that features of one embodiment apply to another embodiment, even if they share the same reference number.

Voltage Dependent on Temperature as Complementary to Absolute Temperature ($V_{CTAT}$)

FIG. 1 shows a comparator 100 in accordance with an embodiment of the application related to a CTAT-type implementation. Reference voltage $V_{CTAT}$ on line 110 and compared voltage $V_{CMP}$ on line 120 are generated by a circuit (e.g., temperature sensing circuit) that will be described below. Comparator 100 compares voltages $V_{CMP}$ and $V_{CTAT}$, and provides resulting signal $C_{OUT}$ on line 130. In various embodiments, $V_{CMP}$ is a voltage that varies with a very small or insignificant temperature coefficient over a wide temperature range. Further, various $V_{CMP}$ values are generated with DAC (digital-to-analog converter) codes as inputs. $V_{CTAT}$ is a complementary to absolute temperature (CTAT) reference voltage and is generated by the temperature sensing circuit at a corresponding temperature. For example, in an application, the temperature sensing circuit is embedded as part of a sensor in a semiconductor device, e.g., a CPU. At operation, the CPU experiences a particular temperature (e.g., operational temperature) that is also experienced by the temperature sensing circuit, and $V_{CTAT}$ is generated having this temperature as an input. If $V_{CMP}$ is equal to $V_{CTAT}$ then signal $C_{OUT}$ is true, e.g., having a high logic. If $V_{CMP}$ is not equal to $V_{CTAT}$, then signal $C_{OUT}$ is provided to another circuit (e.g., an adjusting circuit (not shown)) that changes the DAC codes until $V_{CMP}$ is equal to $V_{CTAT}$. In effect, when $V_{CMP}$ is equal to $V_{CTAT}$, the temperature experienced by the CPU and the temperature sensing circuit, e.g., temperature $T_0$, is also the temperature at which the temperature sensing circuit provides $V_{CTAT}$. Further, this temperature $T_0$ corresponds to a DAC code, e.g., DAC code $C_0$. In various embodiments of the application, the temperatures at which the temperature sensing circuit provides $V_{CTAT}$ and the DAC codes are substantially linearly related. Those skilled in the art will recognize that when the temperatures and the DAC codes are linearly related, the graph representing their relationship on a two dimensional axis is a straight line.

$V_{CTAT}$, $V_{CMP}$ and Corresponding Temperatures

Figure 2:
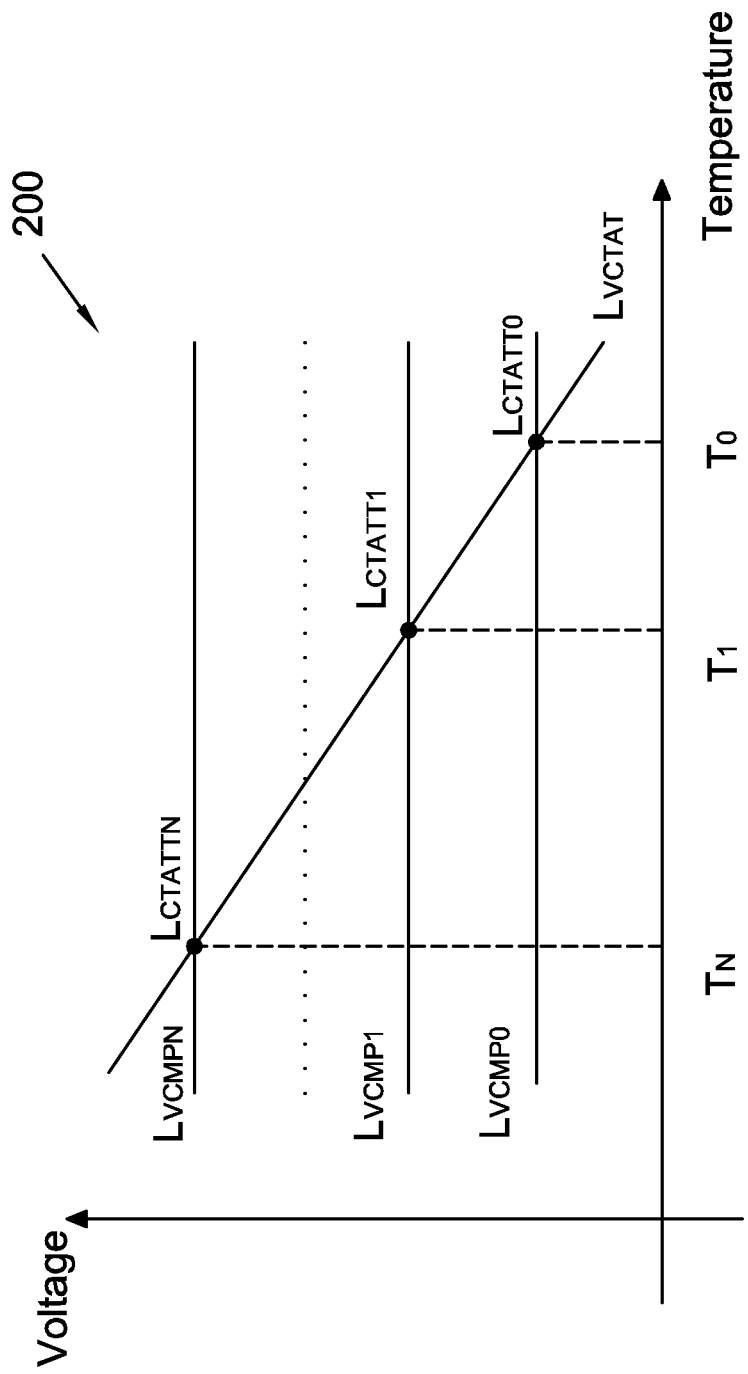
FIG. 2 shows a graph 200 illustrating the relationship between temperature and various voltages in accordance with the CTAT-type embodiments of the application.

FIG. 2 shows a chart 200 illustrating the relationship between $V_{CTAT}$, $V_{CMP}$, and temperatures T, in accordance with an embodiment of the application. Each line $L_{VCMP}$ (including $L_{VCMP0}$, $L_{VCMP1}$, $L_{VCMPN}$, etc.) shows the relationship between a voltage $V_{CMP}$ and temperature T at a particular DAC code serving as an input for $V_{CMP}$ to be generated. Each line $L_{VCMP}$ can be generated by obtaining various values of $V_{CMP}$ at various temperatures (e.g., operational temperatures of a CPU at different time points). In various embodiments of the application, a line $L_{VCMP}$ is substantially independent of temperature. Varying the DAC codes from the least significant bit (LSB) to the most significant bit (MSB) provides lines $L_{VCMP}$. For example, if the DAC receives a 2-bit input, e.g., Input (0:1), varying bits 0 to 1 provides 4 DAC codes that correspond to 4 lines $L_{VCMP}$. If the DAC receives a 3-bit input, e.g., Input (0:2), varying bits 0 to 2 provides 8 DAC codes that correspond to 8 lines $L_{VCMP}$, etc. Further, line $L_{VCMP0}$ corresponds to a code $C_0$, and shows the relationship between voltage $V_{CMP}$ and temperature T at code $C_0$. Line $L_{VCMP1}$ corresponds to code $C_1$, and shows the relationship between voltage $V_{CMP}$ and temperature T at code $C_1$. Line $L_{VCMPN}$ corresponds to code N, and shows the relationship between voltage $V_{CMP}$ and temperature T at code $C_N$, etc. In accordance with embodiments of the application, due to the nature of very small or insignificant temperature coefficient for $V_{CMP}$, lines $L_{VCMP}$ are very close to parallel (e.g., substantially parallel) to one another in addition to being substantially straight. Based on the parallelism of lines $L_{VCMP}$ and their being straight lines, embodiments of the application provide linearity between the temperatures T and the DAC codes.

Line $L^{VCTAT}$ shows the relationship between $V_{CTAT}$ and temperature T. Those skilled in the art will recognize that line $L_{VCTAT}$ has a negative slope and indicates that $V_{CTAT}$ has a negative temperature coefficient. The intersection between line $L_{VCTAT}$ and a line $L_{VCMP}$ indicates that $V_{CTAT}$ equals to $V_{CMP}$ at a particular temperature T that corresponds to a particular DAC code C. For example, point $V_{CTATT0}$ indicates $V_{CTAT}$ equals to $V_{CMP}$ at a temperature $T_0$ that corresponds to a DAC code $C_0$. Similarly, point $V_{CTATT1}$ indicates $V_{CTAT}$ equals to $V_{CMP}$ at a temperature $T_1$ that corresponds to DAC code $C_1$, and $V_{CTATTN}$ indicates $V_{CTAT}$ equals to $V_{CMP}$ at a temperature $T_N$ that corresponds to a DAC code $C_N$, etc. In various embodiments of the application, each point $V_{CTATT}$ corresponds to the result in comparator 100 where $V_{CMP}$ and $V_{CTAT}$ are equal, e.g., when signal $C_{OUT}$ is true, at a particular temperature T experienced by the temperature sensing circuit.

Temperatures and DAC Codes—CTAT-Type

Figure 3:
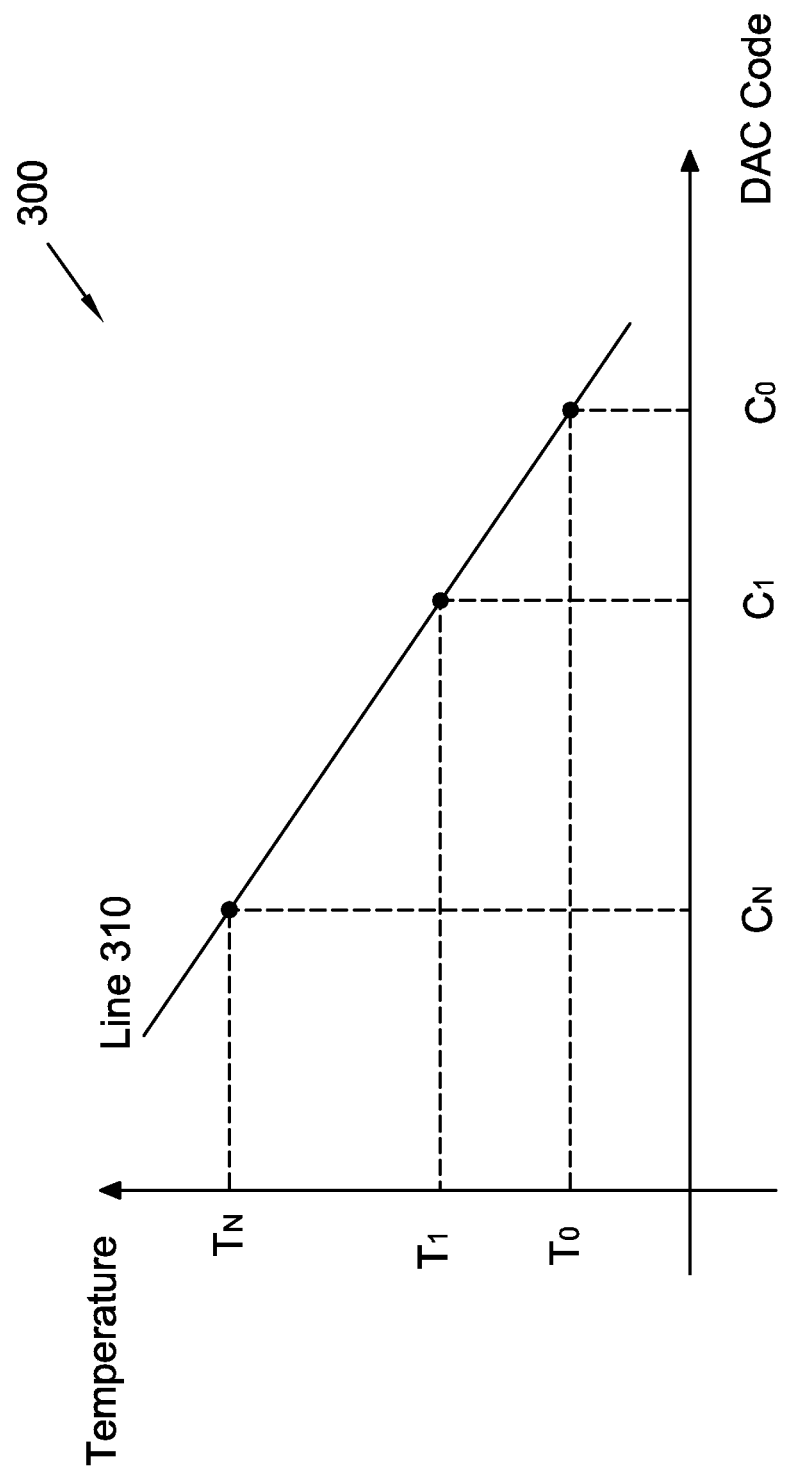
FIG. 3 shows a graph 300 illustrating the relationship between the DAC code and temperature in accordance with the CTAT-type embodiments of the application.

FIG. 3 shows a graph 300 with a line 310 indicating the relationship between temperatures T and DAC codes C related to $V_{CTAT}$. For example, $T_0$ corresponds to code $C_0$, $T_1$ corresponds to code $C_1$, $T_N$ corresponds to code $C_N$, etc.

Embodiments of the application provide the linearity between temperatures and DAC codes C as much as possible, which is advantageous over prior art approaches that do not provide such linearity. This linearity results from the fact that lines $L_{VCMP}$ in FIG. 2 are substantially straight and substantially parallel to one another. In a 100% linearity situation, lines $L_{VCMP}$ are 100% straight and thus 100% parallel to one another, which results in a line 310 being 100% straight. In other approaches lines $L_{VCMP}$ are curved and/or not parallel to one another, which also causes line 310 to be curved. Those skilled in the art will recognize that the less curved the line 310 is, the more linear the relationship between the temperatures T and the DAC codes is. Embodiments of the application are advantageous, especially in high volume manufacturing environment because graph 300, once established, provides the linear relationship between the DAC codes C and temperatures T on line 310. As a result, corresponding temperatures T and DAC codes C can be easily identified. For example, given a DAC code C on the horizontal axis, a corresponding temperature on the vertical axis can be identified using line 310. Similarly, given a temperature T on the vertical axis, a corresponding DAC code on the horizontal axis can be identified using line 310.

In an application, line 310 can be easily and economically established in a simple calibration process near room temperature based on the linear relationship between temperatures and DAC codes C. For example, a temperature sensor embodying a circuit 400 or 500 (e.g., the temperature sensing circuit) is subject to a first known temperature, e.g., temperature $T_1$. Corresponding to temperature $T_1$, a DAC code, e.g., code $C_1$, is identified. The temperature sensing circuit is then subject to a second known temperature, e.g., temperature $T_2$. Corresponding to temperature $T_2$, a DAC code, e.g., code $C_2$ is identified. Based on the linear relationship between temperatures T and DAC codes C, temperatures $T_1$ and $T_2$, and DAC codes $C_1$ and $C_2$, line 310 can be readily established by various techniques known in the art, and embodiments of the application are not limited to a particular technique. In a further application, for example, line 310, once established, is analyzed to program a control circuit that can regulate temperatures T in a semiconductor chip using embodiments of the application. For example, if a DAC code, e.g., code C75, would be identified at a particular operational moment of the chip, then this code C75 corresponds to a temperature, e.g., temperature T75 at 75° C. Because this temperature T75 at 75° C. indicates, for example, that the chip is running at 400 MHz and thus generates too much heat, the control circuit is programmed for the chip to run at a slower rate, e.g., 300 MHz to reduce the generated heat. Similarly, if a DAC code, e.g., code C100, is identified, then this code corresponds to a temperature, e.g., temperature T100 at 100° C. Because this temperature T100 at 100° C. can, for example, damage the chip, the control circuit is programmed to shut down the chip when it recognizes code C100. The above examples are used to illustrate applications of the application, and the application is not limited to any particular example.

Circuit Providing $V_{CTAT}$ and $V_{CMP}$—1$^{st}$ Embodiment

Figure 4:
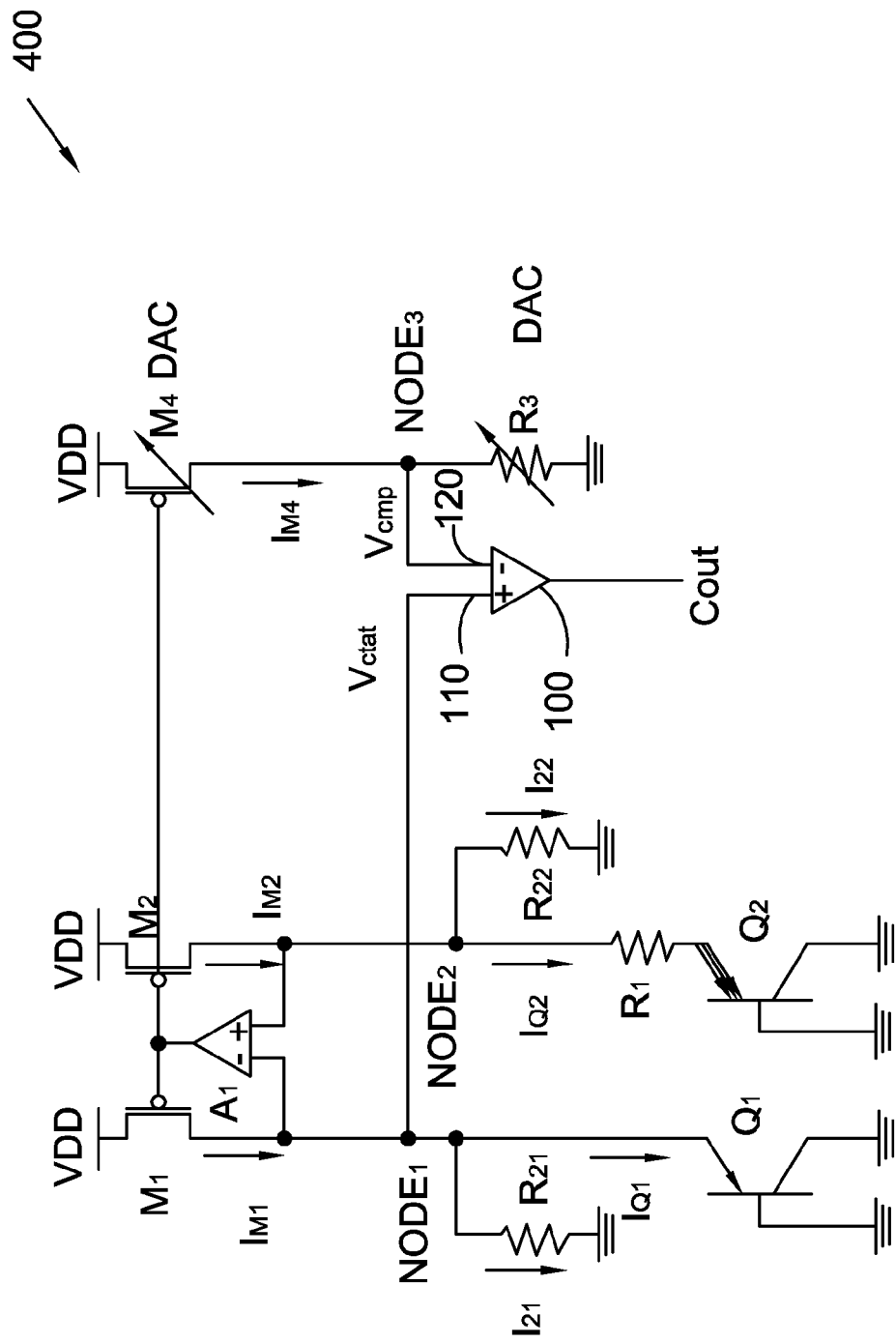
FIG. 4 shows a circuit 400 used to create $V_{CTAT}$ and $V_{CMP}$ in accordance with a first embodiment of the application.

FIG. 4 shows a circuit 400 providing $V_{CTAT}$ and $V_{CMP}$, in accordance with a first embodiment. For illustration purposes, FIG. 4 also includes comparator 100. $V_{CMP}$, going through circuit 400 having a negative temperature coefficient circuit component canceling the temperature effect with a positive temperature coefficient circuit component results in a low or insignificant temperature coefficient.

Transistors $M_1$, $M_2$ and amplifier $A_1$ constitute a current mirror wherein amplifier $A_1$ equalizes current $I_{M1}$ and $I_{M2}$ and voltages at $NODE_1$ and $NODE_2$. Because $I_{M1}$ equals to $I_{M2}$, $I_M$, for illustration purposes, is used to refer to either $I_{M1}$ or $I_{M2}$. At node NODE1 $I_{M1}=I_{21}+I_{Q1}$ while at node $NODE_2$ $I_{M2}=I_{Q2}+I_{22}$. Bipolar transistor $Q_1$ is configured as a diode because a diode has negative temperature coefficient. $V_{CTAT}$ is in fact $V_{BE}$ (voltage from the base to emitter) of transistor $Q_1$, and, for illustration purpose, is referred to as $V_{BEQ1}$. Bipolar transistor $Q_2$ is also configured as a diode, and for illustration purposes, the voltage across the base and emitter of transistor $Q_2$ is referred to as $V_{BEQ2}$. In the embodiment of FIG. 4, CMOS technology is used and transistors $Q_1$ and $Q_2$ are implemented as diodes. Embodiments of the application, however, can use diodes, instead of transistors, or any other devices that their operation depends on temperature. Two resistors $R_{21}$ and $R_{22}$ provide current paths for two currents $I_{21}$ and $I_{22}$ as shown. Because, in the embodiment of FIG. 4, $R_{21}=R_{22}$, either resistor $R_{21}$ or $R_{22}$ may be referred to as $R_2$. Similarly, because $I_{21}=I_{22}$ either current $I_{21}$ or $I_{22}$ may be referred to as $I_2$. Resistor $R_{21}$ is in parallel with transistor $Q_1$ while resistor $R_{22}$ is in parallel with the series of resistor $R_1$ and transistor $Q_2$. $V_{CTAT}$ is the voltage at $NODE_1$ and also the voltage across $V_{BE}$ of transistor $Q_1$ (e.g., $V_{BEQ1}$) such that it has a negative temperature coefficient. The voltage across resistor $R_1$ is the voltage difference between $V_{BEQ1}$ and $V_{BEQ2}$. As a result, it has a positive temperature coefficient. DAC resistors $R_3$ or DAC current $I_{M4}$ provide voltage $V_{CMP}$ wherein $V_{CMP}=I_{M4}*R_3$ at a particular value for $I_{M4}$ or $R_3$. In accordance with embodiments of the application, $V_{CMP}$ is an insignificant temperature dependent voltage. To obtain different values of $V_{CMP}$, different values for DAC current $I_{M4}$ and/or $R_3$ are obtained by varying the DAC codes corresponding each current $I_{M4}$ or varying resistor $R_3$.

DAC transistors $M_4$ indicate that each current $I_{M4}$ provided by a configuration of DAC transistors $M_4$ corresponds to a DAC code. Further, DAC transistors $M_4$ provide a mirrored current $I_{M4}$ that multiplies current $I_M$. That is, $I_{M4}=N*I_M$ where N is the multiplication factor. In the embodiment of FIG. 4, a DAC circuitry controls DAC transistors $M_4$. That is, a digital value of the DAC circuitry corresponds to a value of current $I_{M4}$. For illustration purposes, if the DAC circuitry includes M number of input bits, and N numbers of outputs, then $N=2^M$. For example, if M=2 then $N=2^2$ or 4. If M=3 then $N=2^3$ or 8. If M=4, then $N=2^4$ or 16, etc. Embodiments of the application vary the DAC codes to obtain different values of $I_{M4}$ and, effectively, different $V_{CMP}$. In an embodiment, changing the number of active transistors in DAC transistors M4 changes the DAC codes and thus changes the value of N. Changing the value of N in turns changes the values of current $I_{M4}$. For example, a 2-bit DAC (M=2) results in N=4 ($2^2$) and thus 4 $I_{M4}$ values, a 3-bit DAC (M×3) results in N=8 ($2^3$) and thus 8 $I_{M4}$ values, and a 4-bit DAC (M=4) results in N=16 ($2^4$) and thus 16 $I_{M4}$ values, etc. Further, because voltage $V_{CMP}$ depends on current $I_{M4}$ ($V_{CMP}=I_{M4}*R_3$), if current $I_{M4}$ is provided by a DAC with 4 values, e.g., $I_{M4}(0:3)$, then $V_{CMP}$ corresponds to 4 values $V_{CMP}(0:3)$. If current $I_{M4}$ is provided by a DAC with 8 values, e.g., $I_{M4}(0:7)$, then $V_{CMP}$ corresponds to 8 values $V_{CMP}(0:7)$. If current $I_{M4}$ is provided by a DAC with 16 values, e.g., $I_{M4}(0:15)$, then $V_{CMP}$ corresponds to 16 values $V_{CMP}(0:15)$, etc.

DAC resistors $R_3$ indicate that the values of resistor $R_3$ can also be varied by DAC codes. Similar to the situation of DAC transistors $M_4$, an M-bit input DAC provides N outputs where $N=2^M$. Further, if this DAC controls DAC resistors $R_3$, then N numbers of DAC codes (e.g., N numbers of DAC outputs) correspond to N values of resistor $R_3$. Additionally, because $V_{CMP}=IM4*R_3$, each value of resistor $R_3$ corresponding to a DAC code also corresponds to a value of $V_{CMP}$, similar to the DAC transistors $M_4$ explained above. Embodiments of the application vary the DAC codes to vary the value of $R_3$, and, effectively, $V_{CMP}$. Those skilled in the art will recognize that there are many known techniques to provide various values of $V_{CMP}$ using variations of resistors $R_3$ through DAC codes, and embodiments of the application are not limited to a particular technique.

At node NODE3, because the input impedance of comparator 100 is significantly high, the current on line 120 is insignificant and can be disregarded. As a result:

$$V_{CMP}=I_{M4}*R_3$$

Because $I_{M4}=N*I_M$, $$V_{CMP}=(N*I_M)*R_3$$

Because $I_M=I_{M1}=I_{M2}$ and $I_{M2}=I_{Q2}+I_2$, $$V_{CMP}=N*(I_{Q2}+I_2)*R_3$$

Because $I_{Q2}=(V_{BEQ1}-V_{BEQ2})/R_1=(V_T \ln M_{21})/R_1$ and $I_2=V_{BEQ2}/R_2=V_{BEQ1}/R_2$, $$V_{CMP}=N*((V_T \ln M_{21})/R_1+V_{BEQ1}/R_2)*R_3 \quad (1)$$

In the above equation (1) $V_T$ is a thermal voltage and $V_T$=kT/q where k is the Boltzman constant and q is the unit charge. Further, $M_{21}$ is the area ratio between diodes (or transistors) $Q_2$ and $Q_1$. Based on equation (1), the temperature coefficient of $R_1$ and $R_2$ is canceled by the temperature coefficient of $R_3$ because $R_1$ and $R_2$ are in the denominator while $R_3$ is in the numerator. As a result, the temperature coefficient of $V_{CMP}$ depends on that of the terms $(V_T \ln M_{21})$ and $V_{BEQ1}$. Those skilled in the art will recognize that the temperature coefficient of $V_{BEQ1}$ is negative while the temperature coefficient of $(V_T \ln M_{21})$ is positive, and they substantially cancel one another, resulting in $V_{CMP}$ having a low or insignificant temperature coefficient. As $V_{CMP}$ has a low or insignificant temperature coefficient, lines $L_{VCMP}$ in FIG. 2 are substantially straight and substantially parallel to one another.

Circuit Providing $V_{CTAT}$ and $V_{CMP}$—2$^{nd}$ Embodiment

Figure 5:
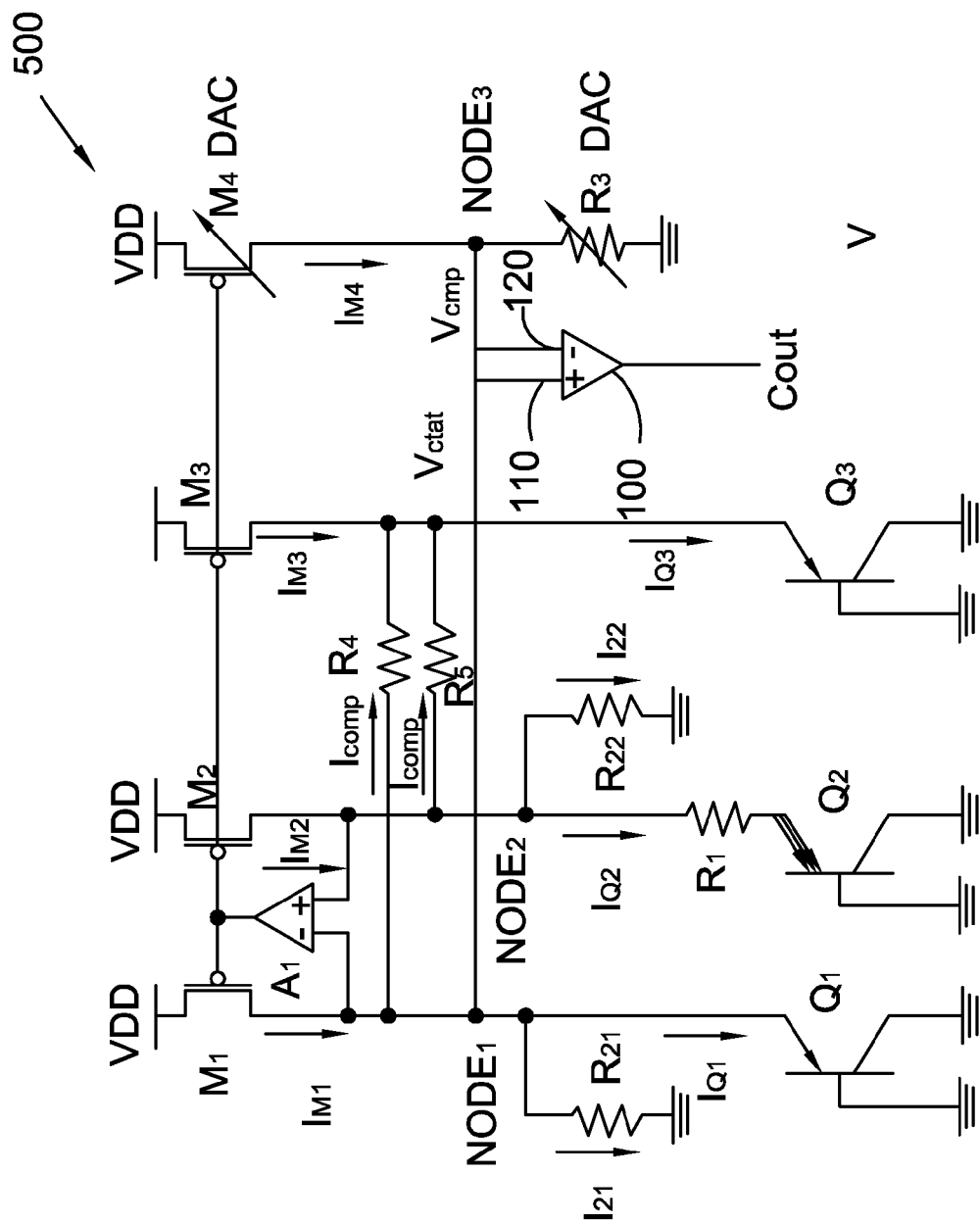
FIG. 5 shows a circuit 500 used to create $V_{CTAT}$ and $V_{CMP}$ in accordance with a second embodiment of the application.

FIG. 5 shows a circuit 500 providing $V_{CTAT}$ and $V_{CMP}$, in accordance with a second embodiment. For illustration purposes, FIG. 5 also includes comparator 100. Similar to circuit 400, circuit 500 includes a negative temperature coefficient circuit component canceling the temperature effect with a positive temperature coefficient circuit component. In addition, circuit 500 also includes additional temperature curvature compensation circuits, and, as a result, $V_{CMP}$, going through circuit 500, results in an even more insignificant temperature coefficient.

Circuit 500 is similar to circuit 400 with the addition of resistors $R_4$, $R_5$, and transistors $M_3$ and $Q_3$ as shown. In the embodiment of FIG. 5 $R_4$=$R_5$ and either resistor $R_4$ or $R_5$ therefore may be referred to as resistor $R_{45}$. Transistor $Q_3$ is also configured as a diode similar to transistors $Q_1$ and $Q_2$. Transistor $M_3$ acts as a current mirror wherein current $I_{M3}$ has the same value as current $I_M$ (i.e., $I_{M1}$ or $I_{M2}$). In an embodiment, the area of transistor $Q_3$ is the same as that of transistor $Q_1$.

Similar to circuit 400, because the input impedance to comparator 100 is significantly high, the current on line 120 is negligible. Therefore, at node $NODE_3$ $$V_{CMP}=I_{M4}*R_3$$

Because $I_{M4}=N*I_M$ $$V_{CMP}=(N*I_M)*R_3$$

Because $I_M=I_{M1}=I_{M2}$ and $I_{M2}=I_{Q2}+I_2+I_{COMP}$, $$V_{CMP}=N(I_{Q2}+I_2+I_{COMP})*R_3$$

Because $I_{Q2}=(V_T \ln M_{21})/R_1$, $I_2=V_{BEQ1}/R_2$ and $I_{COMP}=(V_{BEQ3}-V_{BEQ1})/R_4$ or $(V_{BEQ3}-B_{BEQ1})/R_{45}$, $$V_{CMP}=N([(V_T \ln M_{21})/R_1+V_{BEQ1}/R_2+(V_{BEQ3}-V_{BEQ1})/R_{45}]*R_3 \quad (2)$$

As discussed above, the term $(V_T \ln M_{21})$ has positive temperature coefficient, $V_{BEQ1}$ has negative temperature coefficient. Further, $V_{BEQ3}-V_{BEQ1}$ also has positive temperature coefficient. The temperature coefficient of the terms $(V_T \ln M_{21})$, $V_{BEQ1}$ and $V_{BEQ3}-V_{BEQ1}$ cancels one another, resulting in $V_{CMP}$ with very low or insignificant temperature coefficient.

Those skilled in the art will recognize that, $V_{CMP}$ in equation has a temperature coefficient less than that of $V_{CMP}$ in equation (1). As a result, lines $L_{VCMP}$ in FIG. 2 resulted from circuit 500 are straighter and thus more parallel than lines $L_{VCMP}$ in FIG. 2 resulted from circuit 400. Consequently, line 310 resulted from circuit 500 is straighter than line 310 resulted from circuit 400. In brief, circuit 500 provides a more linear relationship between temperatures T and DAC codes C than circuit 400 does.

Voltage Dependent on Temperature as Proportional to Absolute Temperature ($V_{PTAT}$)

Figure 6:
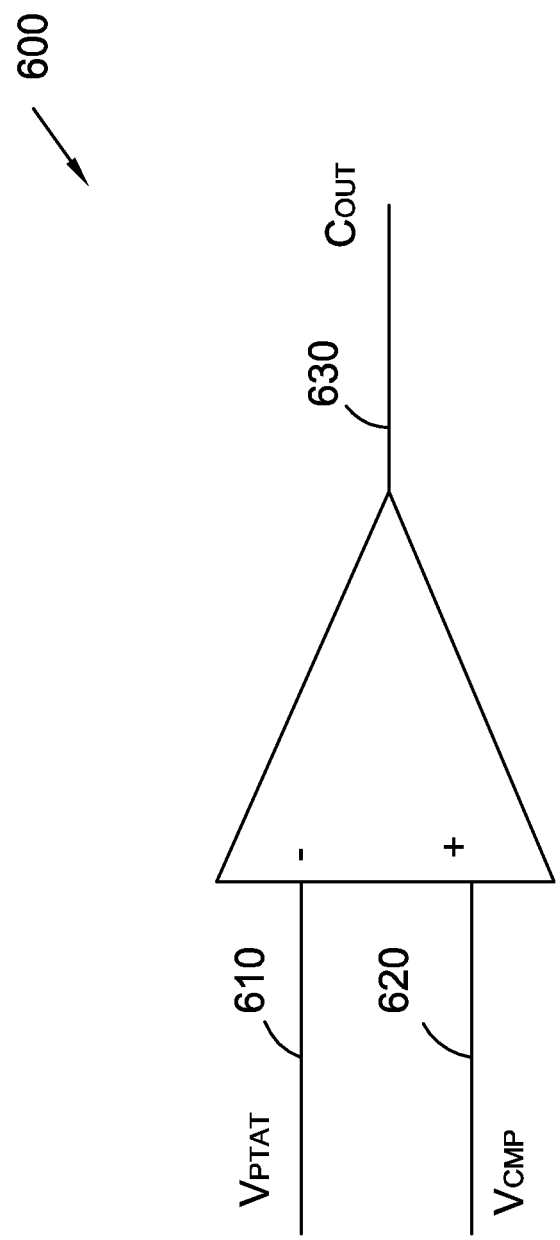
FIG. 6 shows a circuit 600 related to a PTAT-type implementation in accordance with an embodiment of the application.

FIG. 6 shows a comparator 600 in accordance with an embodiment of the application related to a PTAT-type implementation Reference voltage $V_{PTAT}$ on line 610 is generated by a circuit (e.g., temperature sensing circuit) that will be described below. Similar to comparator 100, comparator 600 compares voltages $V_{CMP}$ and $V_{PTAT}$, and provides resulting signal $C_{POUT}$ on line 630. $V_{CMP}$ in the embodiment of FIG. 6 is similar to that of in the embodiments related to the CTAT-type implementation explained above, $V_{PTAT}$ is a proportional to absolute temperature (PTAT) reference voltage and is generated by the temperature sensing circuit at a particular temperature. For example, similar to the CTAT type embodiments and in an application, the temperature sensing circuit is embedded as part of a sensor in a semiconductor device, e.g., a CPU. At operation, the CPU experiences a particular temperature (e.g., operational temperature) that is also experienced by the temperature sensing circuit, and $V_{PTAT}$ is generated having this temperature as an input. If $V_{CMP}$ is equal to $V_{PTAT}$ then signal $C_{OUT}$ is true, e.g., having a high logic. If $V_{CMP}$ is not equal to $V_{PTAT}$, then signal $C_{POUT}$ is provided to another circuit (e.g., an adjusting circuit (not shown)) that changes the DAC codes until $V_{CMP}$ is equal to $V_{PTAT}$. In effect, when $V_{CMP}$ is equal to $V_{PTAT}$, the temperature experienced by the CPU and the temperature sensing circuit, e.g., temperature $T_0$, is also the temperature at which the temperature sensing circuit provides $V_{PTAT}$. Further, this temperature $T_0$ corresponds to a DAC code, e.g., DAC code $C_0$. In various embodiments of the application, the temperatures at which the temperature sensing circuit provides $V_{PTAT}$ and the DAC codes are substantially linearly related. As explained above, those skilled in the art will recognize that when the temperatures and the DAC codes are linearly related, the graph representing their relationship on a two dimensional axis is a straight line.

$V_{PTAT}$, $V_{CMP}$ and Corresponding Temperatures

Figure 7:
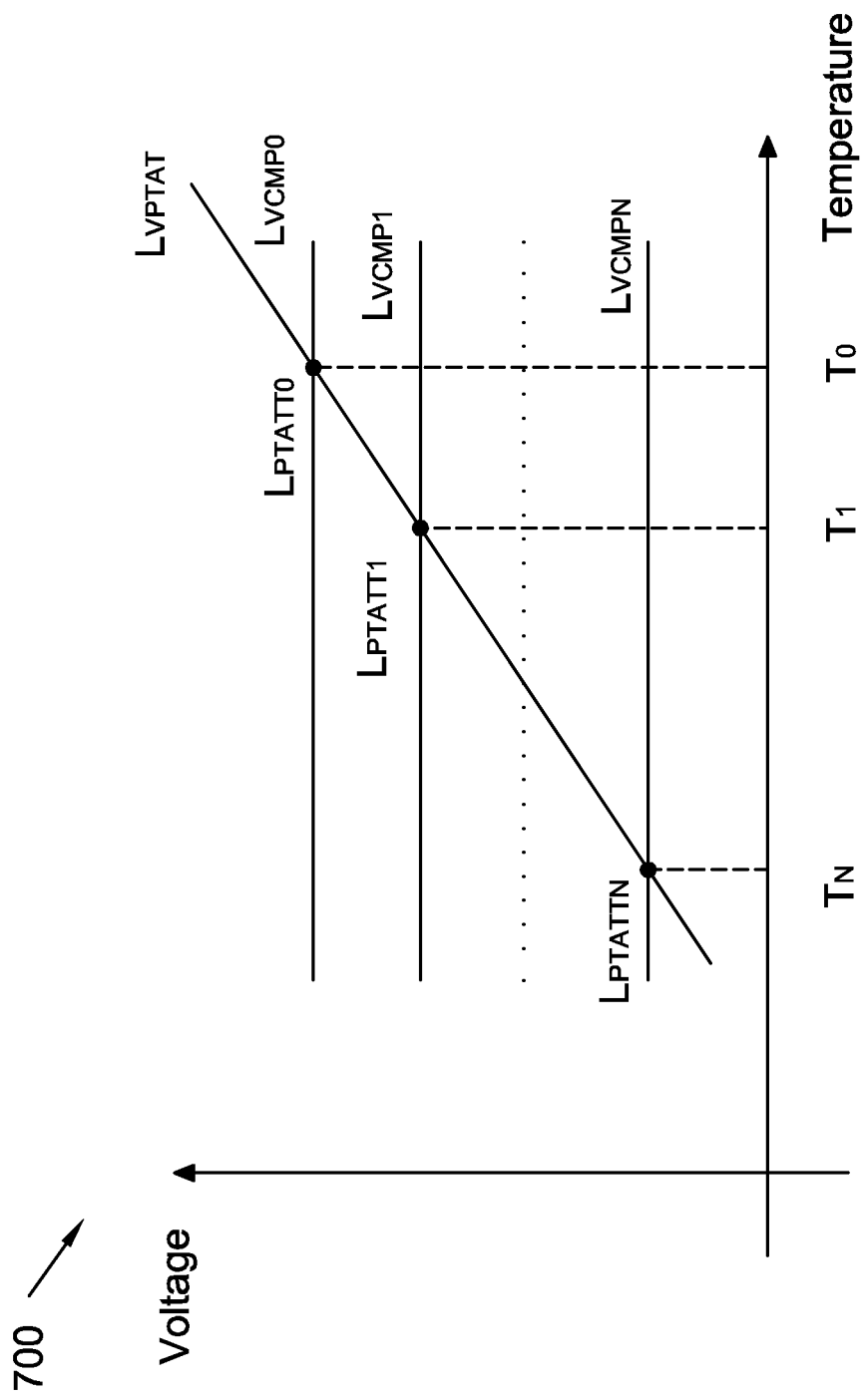
FIG. 7 shows a graph 700 illustrating the relationship between temperature and various voltages in accordance with the PTAT-type embodiments of the application.

FIG. 7 shows a chart 700 illustrating the relationship between $V_{PTAT}$, $V_{CMP}$, and temperatures T, in accordance with an embodiment of the application. As explained in the embodiments related to the CTAT-type implementation, each line $L_{VCMP}$ shows the relationship between a voltage $V_{CMP}$ and temperature T at a particular DAC code serving as an input for $V_{CMP}$ to be generated. Varying the DAC codes from the least significant bit (LSB) to the most significant bit (MSB) provides lines $L_{VCMP}$. In various embodiments of the application, due to the nature of a very small or insignificant temperature coefficient for $V_{CMP}$, lines $L_{VCMP}$ are very close to parallel (e.g., substantially parallel) to one another in addition to being substantially straight. Based on the parallelism of lines $L_{VCMP}$ and their being straight lines, embodiments of the application provide linearity between the temperatures T and the DAC codes.

Line $V_{VPTAT}$ shows the relationship between $V_{PTAT}$ and temperature T. Those skilled in the art will recognize that line $L_{VPTAT}$ has a positive slope and indicates that $V_{PTAT}$ has a positive temperature coefficient. The intersection between line $V_{VPTAT}$ and a line $LV_{CMP}$ indicates that $V_{PTAT}$ equals to $V_{CMP}$ at a particular temperature T that corresponds to a particular DAC code C. For example, point $V_{PTATT0}$ indicates $V_{PTAT}$ equals to $V_{CMP}$ at a temperature $T_0$ that corresponds to a DAC code $C_0$. Similarly, point $V_{PTATT1}$ indicates $V_{PTAT}$ equals to $V_{CMP}$ at a temperature $T_1$ that corresponds to DAC code $C_1$, and $V_{PTATTN}$ indicates $V_{PTAT}$ equals to $V_{CMP}$ at a temperature $T_N$ that corresponds to a DAC code $C_N$, etc. In various embodiments of the application, each point $V_{PTATT}$ corresponds to the result in comparator 600 where $V_{CMP}$ and $V_{PTAT}$ are equal, when signal $C_{POUT}$ is true, at a particular temperature T experienced by the temperature sensing circuit.

Temperatures and DAC Codes—PTAT-Type

Figure 8:
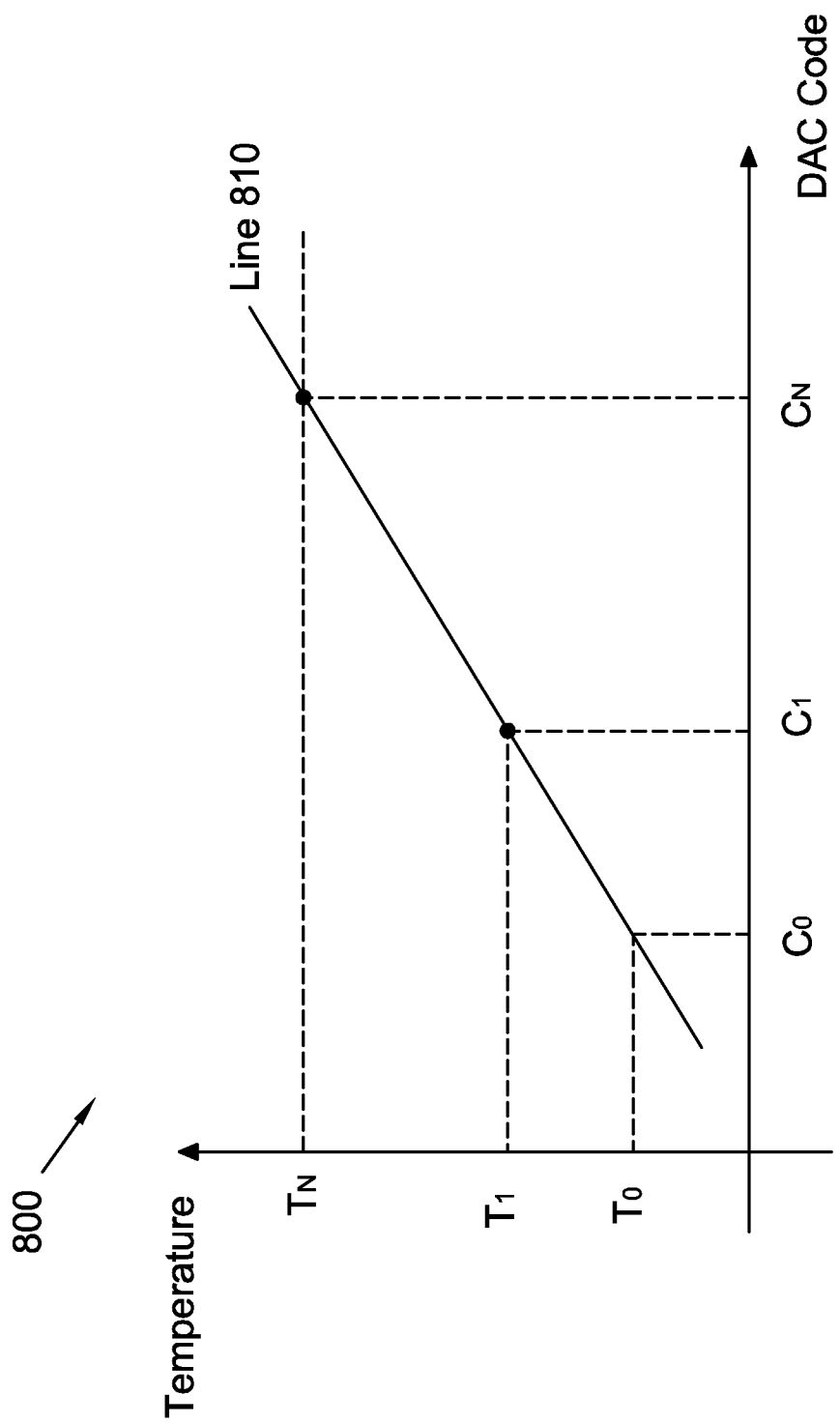
FIG. 8 shows a graph 800 illustrating the relationship between the DAC code and temperature in accordance with the PTAT-type embodiments of the application.

FIG. 8 shows a graph 800 with a line 810 indicating the relationship between temperatures T and DAC codes C related to PTAT. For example, $T_0$ corresponds to code $C_0$, $T_1$ corresponds to code $C_1$, $T_N$ corresponds to code $C_N$, etc.

Embodiments of the application provide the linearity between temperatures T and DAC codes C as much as possible, which is advantageous over prior art approaches that do not provide such linearity. This linearity results from the fact that lines $L_{VCMP}$ in FIG. 7 are substantially straight and substantially parallel to one another. As explained above, in a 100% linearity situation, lines $L_{VCMP}$ are 100% straight and thus 100% parallel to one another, which results in a line 810 being 100% straight. In other approaches lines $L_{VCMP}$ are curved and/or not parallel to one another, which also causes line 810 to be curved. Those skilled in the art will recognize that the less curved the line 810 is, the more linear the relationship between the temperatures T and the DAC codes is. Embodiments of the application are advantageous, especially in high volume manufacturing environment because graph 800, once established, provides the linear relationship between the DAC codes C and temperatures T on line 810. As a result, corresponding temperatures T and DAC codes C can be easily identified. For example, given a DAC code C on the horizontal axis, a corresponding temperature T on the vertical axis can be identified using line 810. Similarly, given a temperature T on the vertical axis, a corresponding DAC code on the horizontal axis can be identified using line 810.

In an application, line 810 can also be easily and economically established in a simple calibration process near room temperature based on the linear relationship between temperatures T and DAC codes C. For example, a temperature sensor embodying a circuit 400 or 500 (e.g., the temperature sensing circuit) with $V_{CTAT}$ being replaced by $V_{PTAT}$ generated by circuit 900 is subject to a first known temperature, e.g., temperature $T_1$. Corresponding to temperature $T_1$, a DAC code, e.g., code $C_1$, is identified. The temperature sensing circuit is then subject to a second known temperature, e.g., temperature $T_2$. Corresponding to temperature $T_2$, a LAC code, e.g., code $C_2$ is identified. Based on the linear relationship between temperatures T and DAC codes C, temperatures $T_1$ and $T_2$, and DAC codes $C_1$ and $C_2$, line 810 can be readily established by various techniques known in the art, and embodiments of the application are not limited to a particular technique. In a further application, for example, line 810, once established, is analyzed to program a control circuit that can regulate temperatures T in a semiconductor chip using embodiments of the application. For example, if a DAC code, e.g., code C75, would be identified at a particular operational moment of the chip, then this code C75 corresponds to a temperature, e.g., temperature T75 at 75° C. Because this temperature T75 at 75° C. indicates, for example, that the chip is running at 400 MHz and thus generates too much heat, the control circuit is programmed for the chip to run at a slower rate, e.g., 300 MHz to reduce the generated heat. Similarly, if a DAC code, e.g., code C125, is identified, then this code corresponds to a temperature, e.g., temperature T125 at 125° C. Because this temperature T125 at 125° C. can, for example, damage the chip, the control circuit is programmed to shut down the chip when it recognizes code C125. The above examples are used to illustrate applications of the application, and the application is not limited to any particular example.

Circuit Providing $V_{PTAT}$ and $V_{CMP}$

In various embodiments of the application, $V_{CMP}$ related to PTAT-type embodiments is generated similarly to that $V_{CMP}$ related to CTAT-type, including using circuits 400 and 500 above.

Figure 9:
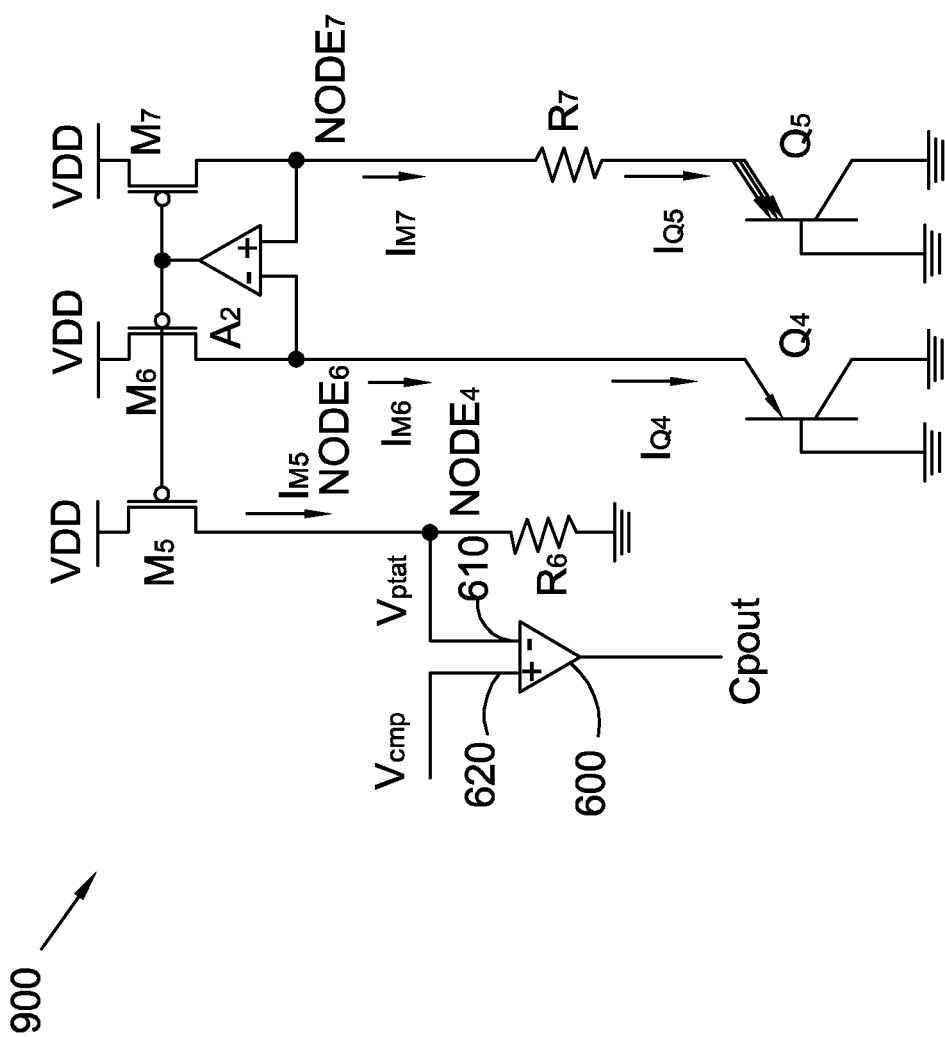
FIG. 9 shows a circuit 900 used to generate $V_{PTAT}$ in accordance with an embodiment of the application.

FIG. 9 shows a circuit 900 used to generate $V_{PTAT}$, in accordance with an embodiment. For illustration purposes, FIG. 9 also includes comparator 600. Circuit 900 is similar to circuit 400 except that circuit 900 does not include resistors corresponding to resistors $R_{21}$ and $R_{22}$. Further, transistors $M_6$ and $M_7$ correspond to transistors $M_1$ and $M_2$ respectively; amplifier $A_2$ corresponds to amplifier $A_1$; resistor $R_7$ corresponds to resistor $R_1$; transistors $Q_4$ and $Q_5$ correspond to transistor $Q_1$ and $Q_2$, respectively. Transistor $M_5$ corresponds to DAC transistors $M_4$ and resistor $R_6$ corresponds to DAC resistors $R_3$. As a result, transistors $M_6$, $M_7$, and amplifier $A_2$ constitute a current mirror wherein amplifier $A_2$ equalizes current $I_{M6}$ and $I_{M7}$ and voltages at $NODE_6$ and $NODE_7$. For illustration purposes, either $I_{M6}$ or $I_{M7}$ may be referred to as $I_{M67}$. Transistor $M_5$ provides a current $I_{M5}$ that mirrors current $I_{M67}$. As a result, at $NODE_4$, because input impedance of comparator 600 is significantly high, the current on line 610 is negligible. As a result, $$V_{PTAT}=I_{M5}*R_6$$

Because $I_{M5}=I_{M6}=I_{M7}=(V_T \ln M_{54})/R_7$ where $M_{54}$ is the area ratio of transistors $Q_5$ and $Q_4$ $$V_{PTAT}=((V_T \ln M_{54})/R7)*R_6$$

Because $V_T=(k*T)/q$ $$V_{PTAT}=(k*T) \ln M_{54}/(q*R_7))*R_6$$

or $$=((k*R_6) \ln M_{54}/(q*R_7))*T \qquad (3)$$

As seen from equation (3), $V_{PTAT}$ depends on T (or temperature) as proportional to absolute temperature. Similar to the CTAT-type embodiments, circuit 900 in conjunction with circuit 400 and DAC codes as explained above provides a linear relationship between DAC codes and temperatures in relation to $V_{PTAT}$. Further, circuit 900 in conjunction with circuit 500 provides a more linear relationship compared to that of circuit 900 in conjunction with circuit 400.

DAC Transistors and DAC Codes

Figure 10:
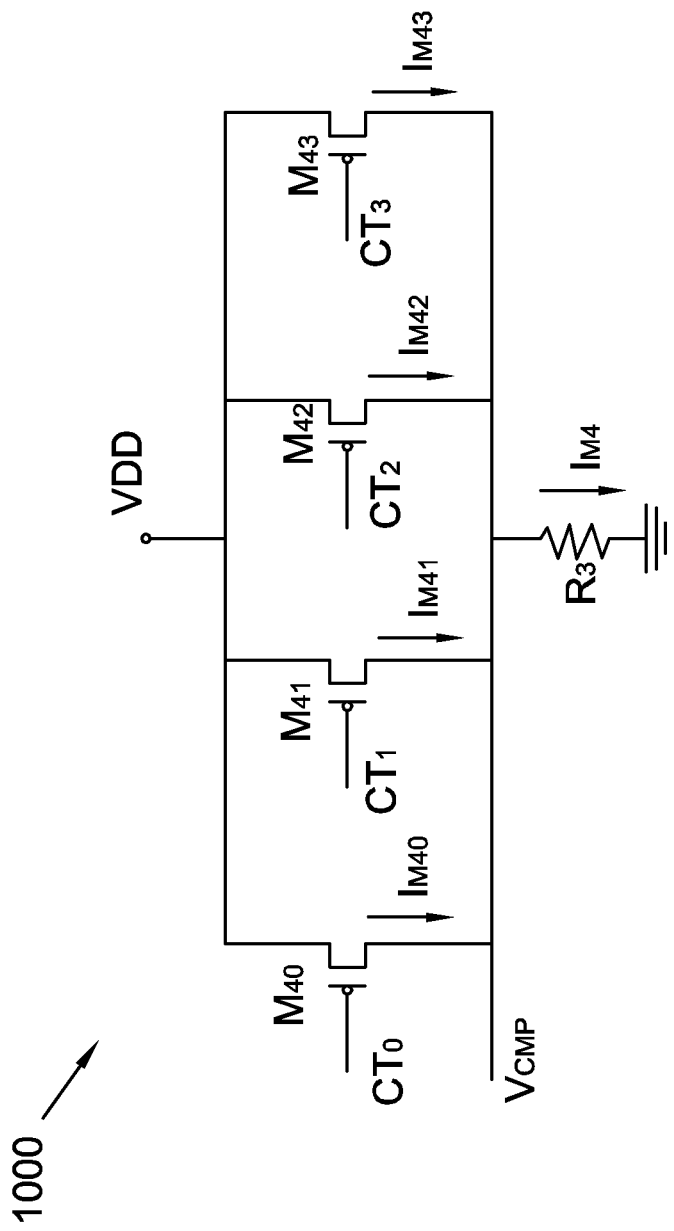
FIG. 10 shows an exemplary circuit 1000 illustrating an implementation of DAC transistors M4.

FIG. 10 shows a circuit 1000 illustrating an implementation example of DAC transistors $M_4$ that provides current $I_{M4}$ (and thus $V_{CMP}$). Circuit 1000 includes four transistors $M_{40}$, $M_{41}$, $M_{42}$, and $M_{43}$, which are controlled (e.g., being turned on or off) by signals $CT_0$, $CT_1$, $CT_2$, and $CT_3$, respectively. For example, to turn each transistor $M_{40}$, $M_{41}$, $M_{42}$, or $M_{43}$ on, each signal $CT_0$, $CT_1$, $CT_2$, or $CT_3$ is activated (e.g., pulled to a low or 0), respectively. Conversely, to turn each transistor $M_{40}$, $M_{41}$, $M_{42}$, or $M_{43}$ off, each signal $CT_0$, $CT_1$, $CT_2$, or $CT_3$ is deactivated (e.g., pulled to a high or 1). Because, in the embodiment of FIG. 10, $I_{M4}=I_{M40}+I_{M41}+I_{M42}+I_{M43}$, a value of current $I_{M4}$ depends on each current $I_{M40}$, $I_{M41}$, $I_{M42}$, and $I_{M43}$. Further, turning on each transistor $M_{40}$, $M_{41}$, $M_{42}$, or $M_{43}$, provides each current $I_{M40}$, $I_{M41}$, $I_{M42}$, or $I_{M43}$ to current $I_{M4}$.

FIG. 11 shows a table 1100 illustrating correspondence between values L and the number of transistors $M_4$ being turned on or off. When L=0, only transistor $M_{40}$ is on. When L=1, transistors $M_{40}$ and $M_{41}$ are on. When L=2, transistors $M_{40}$, $M_{41}$, and $M_{42}$ are on, and when L=3, all transistors $M_{40}$, $M_{41}$, $M_{42}$, and $M_{43}$ are on.

FIG. 12 shows a table 1200 illustrating the relationship between values L and signals CT. Because, when L=0, only transistor $M_{40}$ is on, signal $CT_0$ is low (or 0) while signals $CT_1$, $CT_2$, $CT_3$ are high (or 1). Because when L=1, transistors $M_{40}$ and $M_{41}$ are on, while transistors $M_{42}$ and $M_{43}$ are off, signals $CT_0$ and $CT_1$ are low while signals $CT_2$ and $CT_3$ are high. Because when L=2, transistors $M_{40}$, $M_{41}$, and $M_{42}$ are on, and transistor $M_{43}$ is off, signals $CT_0$, $CT_1$, and $CT_2$ are low while signal $CT_3$ is high. Similarly, because when L=3, all transistors $M_{40}$, $M_{41}$, $M_{42}$, and $M_{43}$ are on, all signals $CT_0$, $CT_1$, $CT_2$, and $CT_3$ are low. Depending on implementations, the values of L or the digital values of signals CT may be considered the digital codes corresponding to DAC currents $I_{M4}$ (or voltage $V_{CMP}$) as explained above. For example, for each value or DAC code L from 0 to 3, there is a corresponding DAC current $I_{M4}$. For another example, for each code 0001, 0011, 0100, or 1111 of signals $CT_0$, $CT_1$, $CT_2$, and $CT_3$ of table 1200, there is a corresponding DAC current $I_{M4}$.

FIGS. 10-12 show four transistors $I_{M4}$, four values of L and four signals CT to correspond to four values of DAC current $I_{M4}$ for illustration purposes only. The application is not limited to four DAC codes, but is applicable to various numbers of DAC codes and various other ways to provide the DAC codes.

Figure 13:
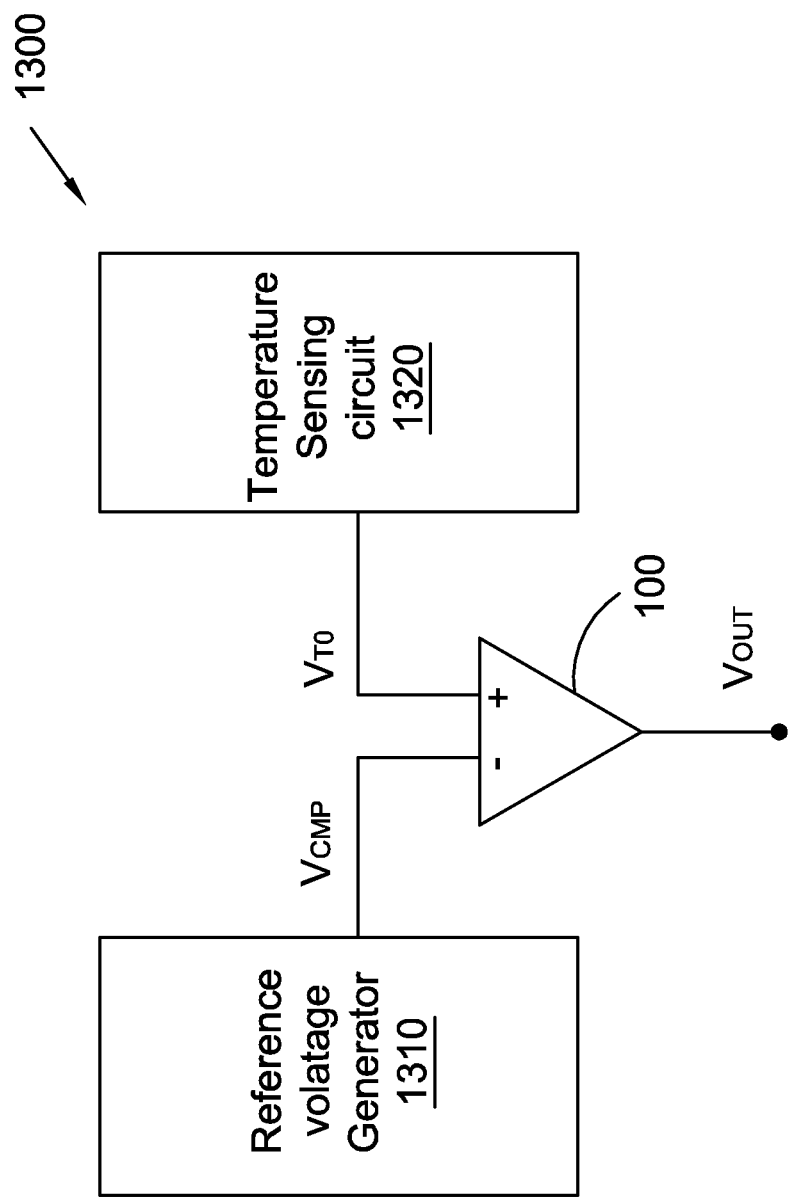
FIG. 13 is a schematic drawing of an exemplary thermal sensor.

FIG. 13 is a schematic drawing of an exemplary thermal sensor. In FIG. 13, a thermal sensor 1300 includes a comparator 100 having input nodes, The thermal sensor 1300 includes a reference voltage generator 1310 that is electrically coupled with an input node of the comparator 100. As noted, the reference voltage generator 1310 is configured to provide a reference voltage $V_{CMP}$ that is substantially temperature-independent. The thermal sensor also includes a temperature sensing circuit 1320 that is electrically coupled with another input node of the comparator 100. As noted, the temperature sensing circuit 1320 is configured to provide a temperature-dependent voltage $V_{TD}$. By comparing the reference voltage $V_{CMP}$ and the temperature-dependent voltage $V_{TD}$, the comparator 100 generates the signal $C_{OUT}$ that is provided to another circuit (e.g., an adjusting circuit (not shown)) that changes the DAC codes until $V_{CMP}$ is equal to $V_{TD}$ as described above in conjunction with FIG. 1.

Following are descriptions regarding using metal-oxide-semiconductor (MOS) transistors in the reference voltage generator and/or the thermal sensing circuit. As noted, transistors $Q_1$ and $Q_2$ can be CMOS transistors, bipolar transistors, diodes, other devices that their operation depends on temperature as described above in conjunction with FIG. 4. The following descriptions merely provide embodiments using MOS transistors and operations in the thermal sensor in further detail.

Figure 14:
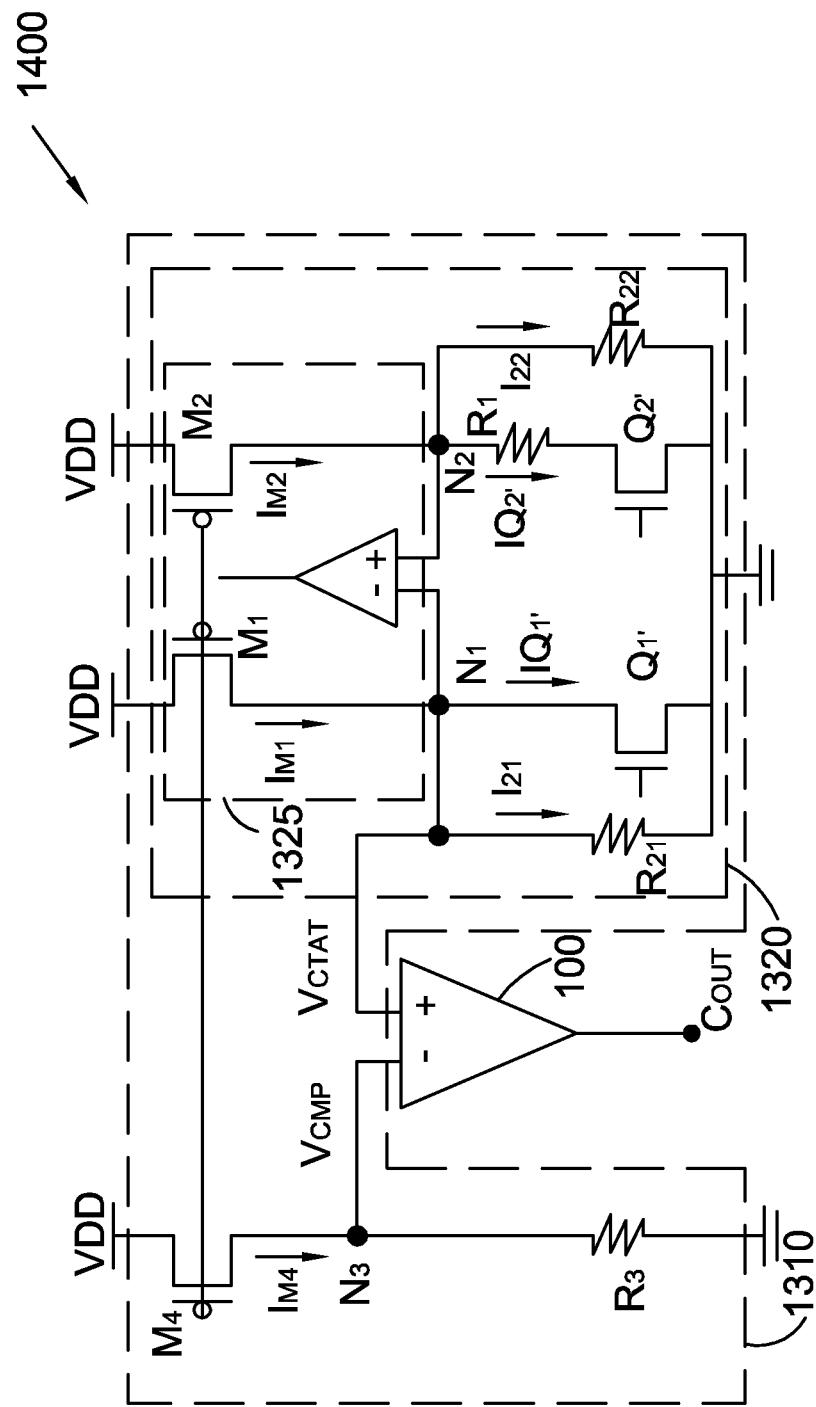
FIGS. 14 and 15 are schematic drawings of exemplary thermal sensors each of which includes a CTAT sensing circuit.

FIG. 14 is a schematic drawing of an exemplary thermal sensor including a CTAT sensing circuit. Items of a thermal sensor 1400 in FIG. 14 that are the same or similar items of the circuit 400 in FIG. 4 are indicated by the same reference numerals or symbols. In FIG. 14, the temperature sensing circuit 1320 of the thermal sensor 1400 is a CTAT sensing circuit that is configured to provide a temperature-dependent voltage $V_{CTAT}$ as described above in conjunction with FIG. 4. The temperature sensing circuit 1320 includes a current mirror 1325. A metal-oxide-semiconductor (MOS) transistor $Q_{1'}$ is electrically coupled between the current mirror 1325 and ground. A node $N_1$ is between the MOS transistor $Q_{1'}$ and the current mirror 1325. The node $N_1$ is electrically coupled with the input node of the comparator 100. A resistor $R_1$ is electrically coupled with the current mirror 1325. A node $N_2$ is between the resistor $R_1$ and the current mirror 1325. A MOS transistor $Q_{2'}$ is electrically coupled with the resistor $R_1$ in series. The MOS transistor $Q_{2'}$ and the resistor $R_1$ are electrically coupled with the MOS transistor $Q_{1'}$ in a parallel fashion.

During the sensing operation of the thermal sensor 1400, the MOS transistors $Q_{1'}$ and $Q_{2'}$ are operable in a sub-threshold region or a weak inversion region. In the sub-threshold region, the MOS transistors $Q_{1'}$ and $Q_{2'}$ have electrical characteristics that are similar to the bipolar transistors $Q_1$ and $Q_2$, respectively, described above in conjunction with FIG. 4. For example, in the sub-threshold operation the voltage gate to source ($V_{GS}$) of the MOS transistors $Q_{1'}$ and $Q_{2'}$ is inversely proportional to absolute temperature. The voltage difference of $V_{GS}$ ($\Delta V_{GS}$) of the MOS transistors $Q_{1'}$ and $Q_{2'}$ is proportional to absolute temperature in the sub-threshold voltage.

By operating the MOS transistors $Q_{1'}$ and $Q_{2'}$ in their sub-threshold region or weak inversion region, the temperature-dependent voltage $V_{CTAT}$ can be generated and provided to the comparator 100. In some embodiments, the channel length/width (L/W) of the MOS transistors $Q_{1'}$ and $Q_{2'}$ can be modified so as to adjust the current $IQ_{1'}$ flowing through the MOS transistor $Q_{1'}$ being substantially equal to the current $IQ_{2'}$ flowing through the MOS transistor $Q_{2'}$.

Figure 15:
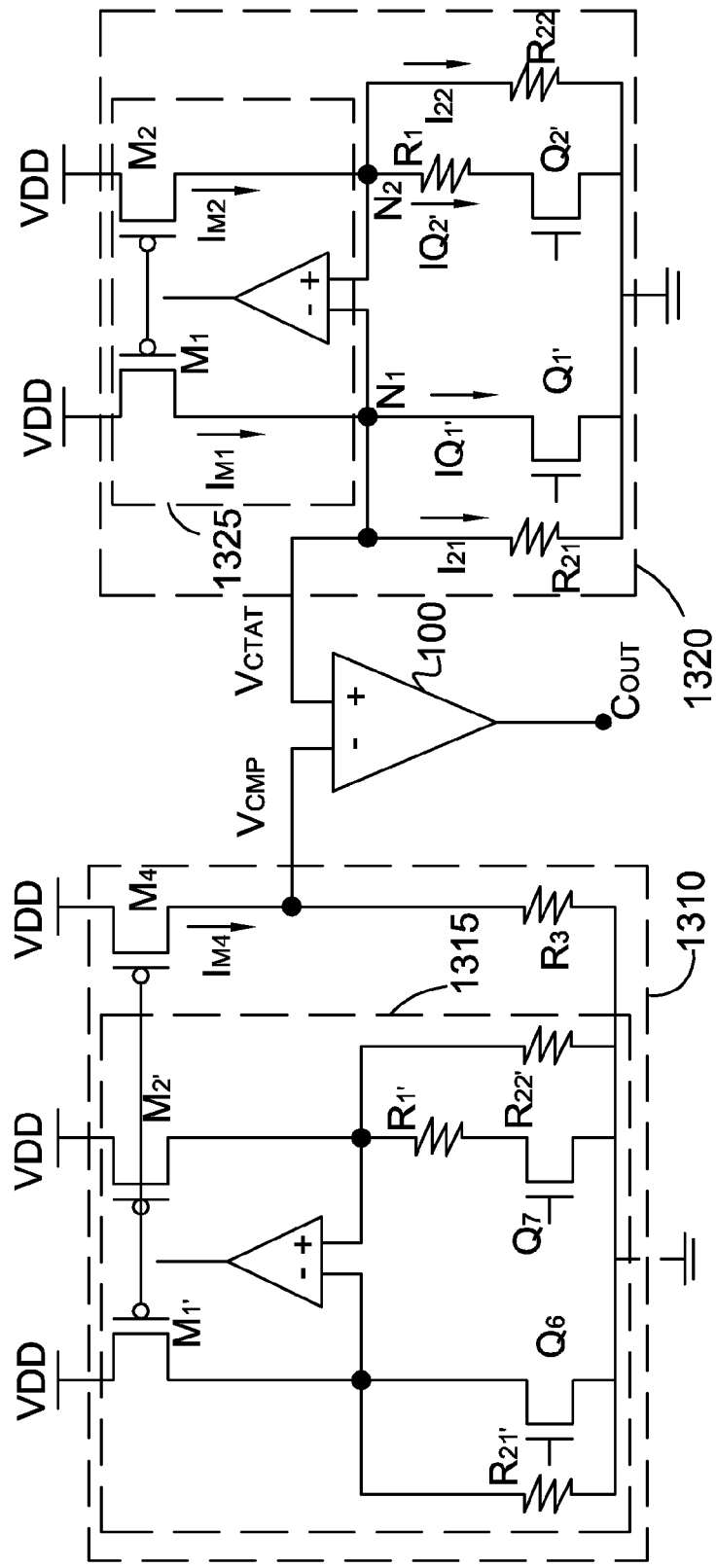

Referring again to FIG. 14, the reference voltage generator 1310 includes the transistor $M_4$ and the resistor $R_3$ as described above in conjunction with FIG. 4. In some embodiments, the reference voltage generator 1310 includes the temperature sensing circuit 1320. The reference voltage $V_{CMP}$ can be provided by coupling the node $N_3$ between the transistor $M_4$ and the resistor $R_3$ to the input node of the comparator 100. In other embodiments, the reference voltage generator 1310 of a thermal sensor 1500 includes a circuit 1315 as shown in FIG. 15. In some embodiments, the circuit 1315 has a structure that is the same or similar to the temperature sensing circuit 1320. For example, the circuit 1315 includes transistors $M_{1'}$ and $M_{2'}$, resistors $R_{1'}$, $R_{21'}$ and $R_{22'}$, and MOS transistors $Q_6$ and $Q_7$ that are operable as the transistors $M_1$ and $M_2$, resistors $R_1$, $R_{21}$ and $R_{22}$, and MOS transistors $Q_{1'}$ and $Q_{2'}$, respectively, during the thermal sensing operation.

In some embodiments, the temperature curvature compensation circuits described above in conjunction with FIG. 5 can be adopted in the thermal sensors 1400 and 1500 described above in conjunction with FIGS. 14 and 15. For example, configuration of the resistors $R_4$ and $R_5$ and the transistors $M_3$ and $Q_3$ (shown in FIG. 5) can be applied in the thermal sensors 1400 and 1500. As noted, the MOS transistors $Q_{1'}$ and $Q_{2'}$ replaces the bipolar transistors $Q_1$ and $Q_2$. The bipolar transistor $Q_3$ can be replaced by another MOS transistor. During the sensing operation of the thermal sensor 1400, the MOS transistor is operable in a sub-threshold region or a weak inversion region that is the same or similar to that of the MOS transistors $Q_{1'}$ and $Q_{2'}$.

Figure 16:
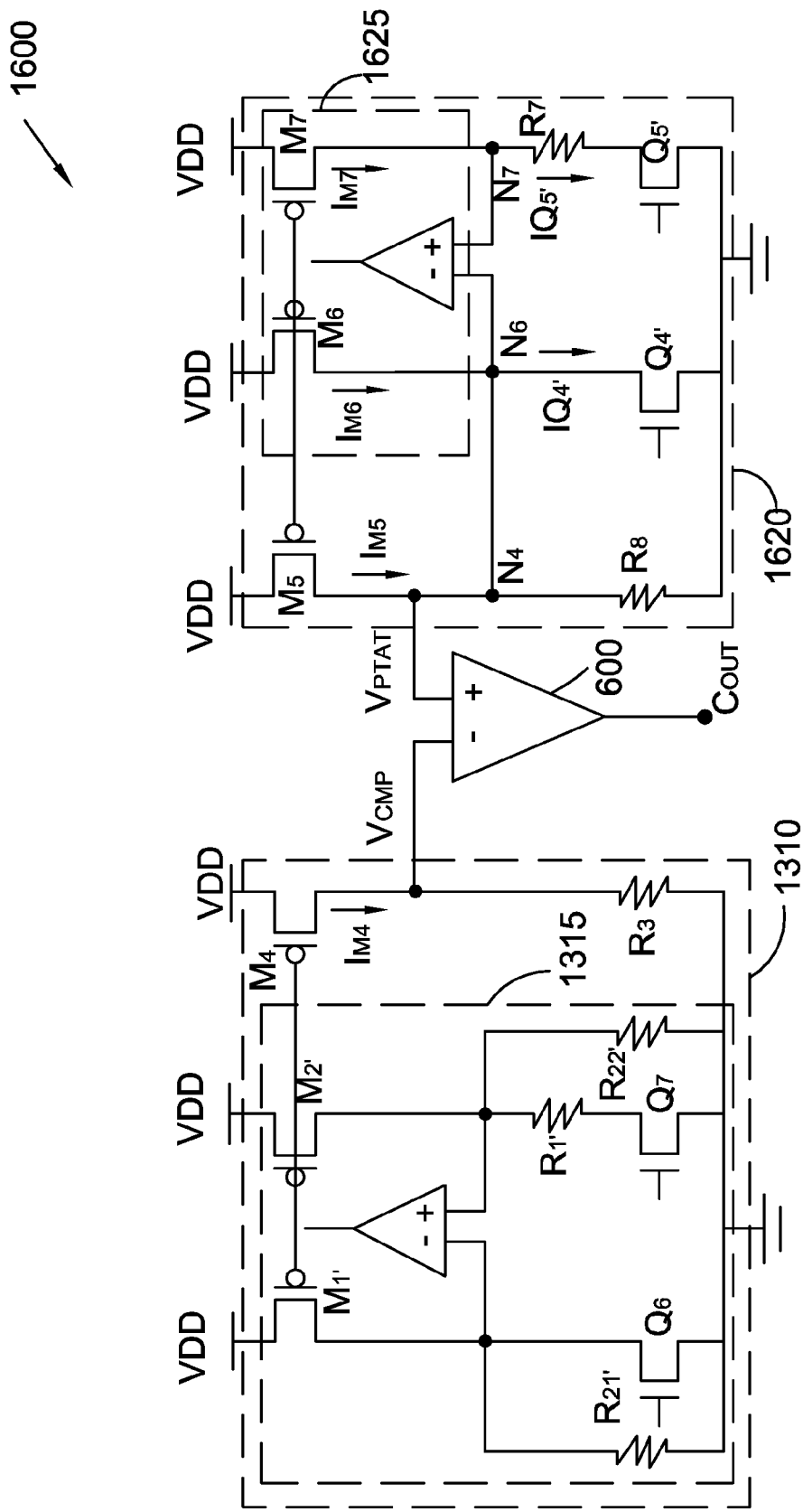
FIG. 16 is a schematic drawing of an exemplary thermal sensor including a PTAT sensing circuit.

FIG. 16 is a schematic drawing of an exemplary thermal sensor including a PTAT sensing circuit. Items of a thermal sensor 1600 in FIG. 16 that are the same or similar items of the circuit 900 in FIG. 9 are indicated by the same reference numerals or symbols. In FIG. 16, the temperature sensing circuit 1620 of the thermal sensor 1600 is a FIAT sensing circuit that is configured to provide a temperature-dependent voltage $V_{PTAT}$ as described above in conjunction with FIG. 9. The temperature sensing circuit 1620 includes a current mirror 1625. A metal-oxide-semiconductor (MOS) transistor $Q_{4'}$ is electrically coupled between the current mirror 1625 and ground. A node $N_6$ is between the MOS transistor $Q_{4'}$ and the current mirror 1625. The node $N_6$ is electrically coupled with the input node of the comparator 600. A resistor $R_7$ is electrically coupled with the current mirror 1625. A node $N_7$ is between the resistor $R_7$ and the current mirror 1625. A MOS transistor $Q_{5'}$ is electrically coupled with the resistor $R_7$ in series. The MOS transistor $Q_{5'}$ and the resistor $R_7$ are electrically coupled with the MOS transistor $Q_{4'}$ in a parallel fashion.

During the sensing operation of the thermal sensor 1600, the MOS transistors $Q_{4'}$ and $Q_{5'}$ are operable in a sub-threshold region or a weak inversion region. In the sub-threshold region, the MOS transistors $Q_{4'}$ and $Q_{5'}$ have electrical characteristics that are similar to the bipolar transistors $Q_4$ and $Q_5$, respectively, described above in conjunction with FIG. 9. By operating the MOS transistors $Q_{4'}$ and $Q_{5'}$ in their sub-threshold region or weak inversion region, the temperature-dependent voltage $V_{PTAT}$ can be generated and provided to the comparator 600. In some embodiments, the channel length/width (L/W) of the MOS transistors $Q_{4'}$ and $Q_{5'}$ can be modified so as to adjust the current $IQ_{4'}$ flowing through the MOS transistor $Q_{4'}$ being substantially equal to the current $IQ_{5'}$ flowing through the MOS transistor $Q_{5'}$.

In some embodiments, the temperature curvature compensation circuits described above in conjunction with FIG. 5 can be adopted in the thermal sensors described above in conjunction with FIGS. 14 and 15. As noted, the MOS transistors and $Q_{2'}$ are used in the thermal sensor 1400. The bipolar transistor $Q_3$ can be replaced by a MOS transistor. During the sensing operation of the thermal sensor 1400, the MOS transistor is operable in a sub-threshold region or a weak inversion region that is the same or similar to the MOS transistors $Q_{1'}$ and $Q_{2'}$.

A number of embodiments of the application have been described. It will nevertheless be understood that various variations and modifications may be made without departing from the spirit and scope of the application. For example, even though resistors (resistors $R_1$, $R_2$, etc., and others) are shown in the described embodiments, they may be replaced by a resistive component, a resistive network, or equivalences thereof. Circuits 400 and 500 are used to generate $V_{CMP}$ and $V_{CTAT}$ together, but different circuits may be used to generate $V_{CMP}$ or $V_{CTAT}$ separately. Circuits to generate $V_{CTAT}$ and $V_{PTAT}$ in the embodiments described above are for illustration purposes only, other circuits that provide a voltage complementary to absolute temperature or proportional to absolute temperature as appropriate are within scope of embodiments of the application. The illustrative embodiments use the term "equal to" or "not equal to," but as long as two elements are close enough to be considered equal (e.g., substantially equal) by a person skilled in the art, they are within scope of embodiments of the application, etc, Each claim in this document constitutes a separate embodiment, and embodiments that combine different claims and/or the above described embodiments are within scope of the application and will be apparent to those skilled in the art after reviewing this disclosure. Accordingly, the scope of the application should be determined with reference to the following claims, along with the full scope of equivalences to which such claims are entitled.

What is claimed is:

1. A thermal sensor comprising:
    a comparator having a first and second input nodes;
    a reference voltage generator electrically coupled with the first input node of the comparator, the reference voltage generator being configured to provide a reference voltage that is substantially temperature-independent; and
    a temperature sensing circuit electrically coupled with the second input node of the comparator, the temperature sensing circuit being configured to provide a temperature-dependent voltage, wherein the temperature sensing circuit comprises:
        a current mirror;
        a first metal-oxide-semiconductor (MOS) transistor electrically coupled between the current mirror and ground, wherein a first node is between the first MOS transistor and the current mirror, and the first node is electrically coupled with the second input node of the comparator;
        a first resistor electrically coupled with the current minor, wherein a second node is between the first resistor and the current mirror;
        a second MOS transistor electrically coupled with the first resistor in series, wherein the second MOS transistor and the first resistor are electrically coupled with the first MOS transistor in a parallel fashion;
        a third MOS transistor electrically coupled with a power source voltage;
        a fourth MOS transistor electrically coupled with the third MOS transistor in series;
        a second resistor electrically coupled between the first node and a third node between the third and fourth MOS transistors; and
        a third resistor electrically coupled between the third node and the second node.

2. The thermal sensor of claim 1, wherein the first and second MOS transistors are operable in a sub-threshold region during a sensing operation of the thermal sensor.

3. The thermal sensor of claim 1, wherein the temperature sensing circuit is a complementary-to-absolute-temperature (CTAT) sensing circuit.

4. The thermal sensor of claim 1, wherein the fourth MOS transistor is operable in a sub-threshold region during a sensing operation of the thermal sensor.

5. The thermal sensor of claim 1, wherein the temperature sensing circuit is a proportional-to-absolute-temperature (PTAT) sensing circuit.

6. The thermal sensor of claim 5, further comprising:
    a fifth MOS transistor electrically coupled with a power source voltage, wherein a gate of the fifth MOS transistor is electrically coupled with the current mirror; and
    a fourth resistor electrically coupled with the fifth MOS transistor in series, wherein a fourth node between the fifth MOS transistor and the fourth resistor is electrically coupled with the first input node of the comparator.

7. The thermal sensor of claim 1, wherein the current mirror comprises a second comparator.

8. The thermal sensor of claim 7, wherein a first input of the second comparator is connected to the first node, and a second input of the second comparator is connected to the second node.

9. A thermal sensor comprising:
a comparator having a first and second input nodes;
a reference voltage generator electrically coupled with the first input node of the comparator, the reference voltage generator being configured to provide a reference voltage that is substantially temperature-independent; and
a proportional-to-absolute-temperature (PTAT) sensing circuit electrically coupled with the second input node of the comparator, the PTAT sensing circuit being configured to provide a temperature-dependent voltage, wherein the PTAT sensing circuit comprises:
a current mirror;
a first metal-oxide-semiconductor (MOS) transistor electrically coupled between the current mirror and ground, wherein a first node is between the first MOS transistor and the current mirror;
a first resistor electrically coupled with the current mirror, wherein a second node is between the first resistor and the current mirror;
a second MOS transistor electrically coupled with the first resistor in series, wherein the second MOS transistor and the first resistor are electrically coupled with the first MOS transistor in a parallel fashion, and the first and second MOS transistors are operable in a sub-threshold region during a sensing operation of the thermal sensor; and
a third MOS transistor electrically coupled with a power source voltage, wherein a gate of the third MOS transistor is electrically coupled with the current mirror; and
a second resistor electrically coupled with the third MOS transistor in series, wherein a third node between the third MOS transistor and the second resistor is electrically coupled with the first input node of the comparator.

10. The thermal sensor of claim 9, further comprising:
a fourth MOS transistor electrically coupled with a power source voltage;
a fifth MOS transistor electrically coupled with the third MOS transistor in series, wherein a fourth node is between the fourth and fifty MOS transistors;
a third resistor electrically coupled between the fourth node and the first node; and
a fourth resistor electrically coupled between the fourth node and the second node.

11. The thermal sensor of claim 10, wherein the fifth MOS transistor is operable in a sub-threshold region during a sensing operation of the thermal sensor.

12. The thermal sensor of claim 9, wherein the current minor comprises a second comparator.

13. The thermal sensor of claim 12, wherein a first input of the second comparator is connected to the first node, and a second input of the second comparator is connected to the second node.

14. A thermal sensor comprising:
a comparator having a first input node and a second input node;
a reference voltage generator electrically coupled with the first input node of the comparator; and
a proportional to absolute temperature (PTAT) sensing circuit electrically coupled with the second input node of the comparator, wherein the temperature sensing circuit comprises;
a current mirror;
a first metal-oxide-semiconductor (MOS) transistor electrically coupled between the current mirror and ground, wherein a first node is between the first MOS transistor and the current mirror;
a first resistor electrically coupled with the current mirror, wherein a second node is between the first resistor and the current mirror;
a second MOS transistor electrically coupled with the first resistor in series, wherein the second MOS transistor and the first resistor are electrically coupled with the first MOS transistor in a parallel fashion; and
a second current mirror coupled to the first node, wherein the second current mirror is between the current mirror and the comparator.

15. The thermal sensor of claim 14, wherein the first MOS transistor and the second MOS transistor are each configured to operate in a sub-threshold region.

16. The thermal sensor of claim 14, wherein the current minor comprises an amplifier.

17. The thermal sensor of claim 16, wherein the amplifier is configured to equalize a voltage level at the first node and a voltage level at the second node.

18. The thermal sensor of claim 16, wherein the amplifier is configured to equalize a current through the first MOS transistor and a current through the second MOS transistor.

19. The thermal sensor of claim 14, wherein the current minor comprises a second comparator.

20. The thermal sensor of claim 19, wherein a first input of the second comparator is connected to the first node, and a second input of the second comparator is connected to the second node.

* * * * *